United States Patent
Easwar

(10) Patent No.: US 7,051,040 B2
(45) Date of Patent: May 23, 2006

(54) IMAGING SYSTEM PROVIDING DYNAMIC VIEWPORT LAYERING

(75) Inventor: Venkat Easwar, Cupertino, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 447 days.

(21) Appl. No.: 10/273,670

(22) Filed: Oct. 18, 2002

(65) Prior Publication Data
US 2004/0017393 A1 Jan. 29, 2004

Related U.S. Application Data

(60) Provisional application No. 60/398,211, filed on Jul. 23, 2002.

(51) Int. Cl.
*G06F 17/30* (2006.01)

(52) U.S. Cl. .................................... 707/102
(58) Field of Classification Search ................ 707/102, 707/104.1; 709/203; 348/47; 382/100, 232; 352/85, 243
See application file for complete search history.

(56) References Cited

U.S. PATENT DOCUMENTS

| 6,014,763 | A | * | 1/2000 | Dhong et al. ............... 714/724 |
| 6,023,714 | A | | 2/2000 | Hill et al. |
| 6,167,441 | A | | 12/2000 | Himmel |
| 6,226,642 | B1 | | 5/2001 | Beranek et al. |
| 6,397,230 | B1 | | 5/2002 | Carmel et al. |
| 2003/0174286 | A1 | * | 9/2003 | Trumbull .................... 352/243 |
| 2003/0231785 | A1 | * | 12/2003 | Rhoads et al. ............. 382/100 |
| 2004/0022444 | A1 | * | 2/2004 | Rhoads ....................... 382/232 |

FOREIGN PATENT DOCUMENTS

| WO | WO 01/57718 A2 | 8/2001 |
| WO | WO 02/15128 A1 | 2/2002 |

OTHER PUBLICATIONS

Kelly, P.M. et al., CANDID: comparison algorithm for navigating digital image database, Sep. 1994, Scientific and Statistical Database Management, Proc., pp. 252–258.*
International Search Report for International Application No. PCT/US03/22888, Mailed Nov. 27, 2003.

* cited by examiner

*Primary Examiner*—Diane D. Mizrahi
(74) *Attorney, Agent, or Firm*—Blakely, Sokoloff, Taylor & Zafman; Judith A. Szepesi

(57) ABSTRACT

A system including methodology for optimizing/customizing display or rendering of requested images is described. In one embodiment, the system provides on-demand creation of images that are customized for a particular device type. The system comprises a module serving as a repository for images, each image comprising image components arranged into distinct layers; a module for processing a request from a device for retrieving a particular image from the repository, the module determining a particular device type for the device based in part on information contained in the request; and a module for creating a copy of the particular image that is customized for the device, the module individually rendering image components in the distinct layers of the particular image based on the determined device type, such that at least some of the image components in the distinct layers of the particular image are customized for the device.

48 Claims, 10 Drawing Sheets

IMAGING SYSTEM PROVIDING DYNAMIC VIEWPORT LAYERING

RELATED APPLICATIONS

The present application is related to and claims the benefit of priority of the following commonly-owned provisional application(s): application Ser. No. 60/398,211, filed Jul. 23, 2002, entitled "Imaging System Providing Dynamic Viewport Layering", of which the present application is a nonprovisional application thereof. The present application is related to the following commonly-owned application(s): pending application Ser. No. 10/010,616, filed Nov. 8, 2001, entitled "System and Methodology for Delivering Media to Multiple Disparate Client Devices Based on Their Capabilities"; pending application Ser. No. 09/588,875, filed Jun. 6, 2000, entitled "System and Methodology Providing Access to Photographic Images and Attributes for Multiple Disparate Client Devices". The disclosures of each of the foregoing applications are hereby incorporated by reference in their entirety, including any appendices or attachments thereof, for all purposes.

COMPUTER PROGRAM LISTING APPENDIX

This application includes a transmittal under 37 C.F.R. §1.52(e) of a Computer Program Listing Appendix comprising duplicate compact discs (2), respectively labeled "Copy 1" and "Copy 2". The discs are IBM-PC machine formatted and Microsoft® Windows Operating System compatible, and include identical copies of the following list of files:

| File Name | Created/Last Modified | File Size (KB) |
| --- | --- | --- |
| bezierlayer.cpp | Oct. 17, 2002 12:00:00 PM | 13.7 |
| bezierlayer.h | Oct. 17, 2002 12:00:00 PM | 4.3 |
| consts.h | Oct. 17, 2002 12:00:00 PM | 2.5 |
| error.cpp | Oct. 17, 2002 12:00:00 PM | 2.5 |
| error.h | Oct. 17, 2002 12:00:00 PM | 2.9 |
| framemap.cpp | Oct. 17, 2002 12:00:00 PM | 8.0 |
| framemap.h | Oct. 17, 2002 12:00:00 PM | 2.9 |
| imageframe.cpp | Oct. 17, 2002 12:00:00 PM | 7.9 |
| imageframe.h | Oct. 17, 2002 12:00:00 PM | 4.8 |
| imagelayer.cpp | Oct. 17, 2002 12:00:00 PM | 23.6 |
| imagelayer.h | Oct. 17, 2002 12:00:00 PM | 4.6 |
| imagesequence.cpp | Oct. 17, 2002 12:00:00 PM | 3.6 |
| imagesequence.h | Oct. 17, 2002 12:00:00 PM | 3.0 |
| imagexfm.cpp | Oct. 17, 2002 12:00:00 PM | 47.1 |
| imagexfm.h | Oct. 17, 2002 12:00:00 PM | 6.4 |
| layer.cpp | Oct. 17, 2002 12:00:00 PM | 8.5 |
| layer.h | Oct. 17, 2002 12:00:00 PM | 5.2 |
| parse_image_xml.cpp | Oct. 17, 2002 12:00:00 PM | 36.8 |
| parse_image_xml.h | Oct. 17, 2002 12:00:00 PM | 3.6 |
| Readme.txt | Oct. 17, 2002 12:00:00 PM | 0.7 |
| textlayer.cpp | Oct. 17, 2002 12:00:00 PM | 9.2 |
| textlayer.h | Oct. 17, 2002 12:00:00 PM | 3.4 |
| viewport.cpp | Oct. 17, 2002 12:00:00 PM | 26.8 |
| viewport.h | Oct. 17, 2002 12:00:00 PM | 9.0 |
| viewportmap.cpp | Oct. 17, 2002 12:00:00 PM | 6.6 |
| viewportmap.h | Oct. 17, 2002 12:00:00 PM | 3.5 |

All of the material disclosed in the Computer Program Listing Appendix is hereby incorporated by reference into the present application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to digital image processing and, more particularly, to improved techniques for rendering digital images on different devices.

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanism and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital imaging is becoming increasingly popular because of the flexibility it gives the user when he or she wants to use or distribute an image.

Regardless of where they originate, digital images are often manipulated by users. Using Adobe Photoshop on a desktop computer, for example, a user can manually create an image by layering different objects on top of one another. For instance, one layer of an image may contain artwork, another layer may contain text, another layer may contain a bitmap border, and so forth and so on. The image, with its separate layers, may then be saved in Photoshop (native) file format, or saved in one of a variety of different file formats.

Using Photoshop, one could conceivably pre-generate different versions of a given image (i.e., pre-render the image's different layers) so that the image is correctly rendered for each possible (display-enabled) device in the world. However, that approach is not really practical. The various devices have constraints as to file size (e.g., less than 5K bytes), bit depth constraints (e.g., no more than 8 bits per pixel), and image size constraints (e.g., image cannot be more than 100 by 100 pixels). Thus, the task of creating an acceptable version of the image for thousands of devices is impractical.

Consider, for example, the task of layering a character (e.g., Disney character) on top of artwork (e.g., bitmap background), for display on a target device capable of displaying JPEG. In this case, the artwork would need to be resized to the screen size of the target device. The character would then have to be overlaid (layered) on top of the resized artwork, and finally the image would need to be saved to the correct JPEG quality. If the generated image file were too big for the target device, the process would have to be repeated, including resizing the background artwork and relayering the character on top of the artwork. Using currently available tools, the task is at best tedious and labor-intensive. Further, the foregoing manual (i.e., pre-rendering) approach is only possible when one is dealing with static images. If a user wants to layer an object on top of an existing image instantaneously, the manual approach does not offer a possible solution.

Existing approaches to layering objects rely on browser-based, online techniques. However, those approaches are basically online versions of the above-described desktop approach (i.e., Adobe Photoshop approach). In particular, those approaches do not take into account the various constraints that may be imposed by a given target device, such as a handheld device. Instead, those approaches rely on an environment with a fixed set of device constraints (i.e., a fixed viewport). If the image is transferred to a target device, the image may have to be resized. Since the image is not being dynamically re-created, one cannot take advantage of vector graphics; thus, certain features of the image will be lost. For example, text that looks good when displayed on a desktop browser at 640 by 480 resolution will look awful when resized for display on a mobile device having a screen resolution of 100 by 100. Instead, it would be desirable to render the text (as well as any other graphics) based on the target device's final screen resolution as well as any other applicable target device constraints. Given these and other limitations of current approaches, a better solution is sought.

What is needed is a system providing methods that allow dynamic reshaping of a logical viewport and allow dynamic adjusting of encoding parameters, including file size constraints, so that rendering of digital images is dynamically optimized or customized for different target devices. The present invention fulfills this and other needs.

Glossary

The following definitions are offered for purposes of illustration, not limitation, in order to assist with understanding the discussion that follows.

ColorSpace correction: Color space correction is the process of adjusting the R,G, B values in an image to suit the color chromaticities of the target display's red, green, and blue. See, e.g., Poynton, C. A., "A Technical Introduction of Digital Video," Chapter 7, John Wiley, New York, 1996, the disclosure of which is hereby incorporated by reference.

Gamma Correction: This is the process of compensating for a display's non-linearity by applying the inverse of the display's nonlinearity to the source image. See, e.g., Poynton, C. A., "A Technical Introduction of Digital Video," Chapter 6, John Wiley, New York, 1996, the disclosure of which is hereby incorporated by reference.

HTML: Short for HyperText Markup Language, the well-known authoring language used to create documents on the World Wide Web. HTML is similar to SGML, although it is not a strict subset. HTML defines the structure and layout of a Web document by using a variety of tags and attributes. See, e.g., RFC 1866: Hypertext Markup Language—2.0, the disclosure of which is hereby incorporated by reference.

HTTP: Short for HyperText Transfer Protocol, this is the underlying protocol used by the World Wide Web. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3), and is currently available via the Internet at http://www.w3.org/Protocols/.

Red eye Compensation: The "red eye" effect is caused by a camera's flash reflecting off of the retina of the human eye. Computer algorithms that "desaturate" the red to darker colors can reduce the "redness." See, e.g., U.S. Pat. No. 6,278,491, issued to Wang et al., and entitled "Apparatus and a method for automatically detecting and reducing red-eye in a digital image," the disclosure of which is hereby incorporated by reference.

Sharpen: This is the process of "crispening" the gray-scale edges in the image for improved appearance or to compensate for a blurry display. This is typically achieved through "unsharp masking." See, e.g., Jain, A. K., "Fundamentals of Image Processing", Prentice Hall, Engelwood Cliffs, N.J., 1989, describing how a low pass filtered version of an image may be subtracted from the image, the disclosure of which is hereby incorporated by reference.

URL: Abbreviation of Uniform Resource Locator, the global address of documents and other resources on the World Wide Web. The first part of the address indicates what protocol to use, and the second part specifies the IP address or the domain name where the resource is located.

Viewport: Viewport refers to a target display that the user will view the final image on. For example, in the case of a mobile handheld device, the viewport is the device's screen. However, depending on the individual target device, the viewport is not necessarily constrained to the screen's physical size. If the device includes scroll capability, for instance, the viewport's (logical) size may exceed the screen's physical size.

Whitepoint Correction: The whitepoint is the color coordinates of the "reference white" in a given environment. The human eye is capable of "chromatic adaptation" to the whitepoint. Whitepoint correction is the process of adjusting the R, G, B color coordinates to account for the human eye's adjustment to the target display's whitepoint. See, e.g., Giorgianni, E. J. et al., "Digital Color Management," Addison-Wesley, Reading, Mass., 1998, the disclosure of which is hereby incorporated by reference.

XML: XML stands for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see e.g., "Extensible Markup Language (XML) 1.0," (2nd Edition, Oct. 6, 2000) a recommended specification from the W3C, the disclosure of which is hereby incorporated by reference. A copy of this specification is currently available on the Internet at http://www.w3.org/TR/2000/REC-xml-20001006.

SUMMARY OF THE INVENTION

A system for on-demand creation of images that are customized for a particular device type is described. In one embodiment, the system comprises a module serving as a repository for images, each image comprising image components arranged into distinct layers; a module for processing a request from a device for retrieving a particular image from the repository, the module determining a particular device type for the device based in part on information contained in the request; and a module for creating a copy of the particular image that is customized for the device, the module individually rendering image components in the distinct layers of the particular image based on the determined device type, such that at least some of the image components in the distinct layers of the particular image are customized for the device.

A method for dynamically optimizing display of an image transmitted to a client device is also described. In one embodiment, the method includes steps of receiving an online request from a particular client device for retrieving a target image for display, the request including information assisting with determination of a device type for the client device, and the target image comprising image components arranged into individual layers; based on the request, determining a device type for the particular client device; based on the determined device type, retrieving information specifying viewport and layering information for the particular client device; based on the viewport and layering information, creating a version of the target image optimized for display at the particular client device; and transmitting the created version of the target image to the client device for display.

DETAILED DESCRIPTION OF A PREFERRED EMBODIMENT

The following description will focus on the currently preferred embodiment of the present invention, which is implemented in a digital imaging environment. The present invention is not, however, limited to any one particular application or any particular environment. Instead, those skilled in the art will find that the system and methods of the present invention may be advantageously employed on a variety of different devices. Therefore, the description of the exemplary embodiment that follows is for purpose of illustration and not limitation.

I. Digital Camera-Based Implementation

A. Basic Components of Digital Camera

Figure 1:
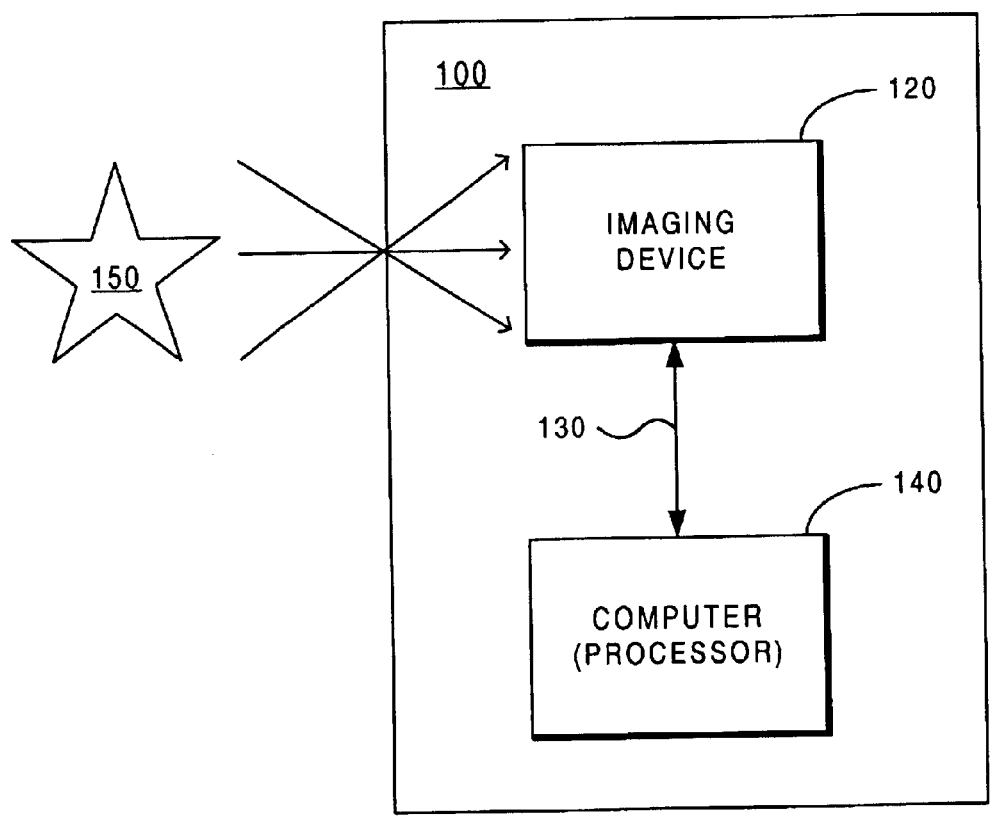
FIG. 1 is a very general block diagram of a digital camera suitable for implementing the present invention.

The present invention may be implemented on a media capturing and recording system, such as a digital camera. FIG. 1 is a very general block diagram of a digital camera 100 suitable for implementing the present invention. As shown, the digital camera 100 comprises an imaging device 120, a system bus 130, and a processor or computer 140 (e.g., microprocessor-based unit). Also shown is a subject or object 150 whose image is to be captured by the digital camera 100. The general operation of these components of the digital camera 100 in capturing an image of the object 150 will now be described.

As shown, the imaging device 120 is optically coupled to the object 150 in the sense that the device may capture an optical image of the object. Optical coupling may include use of optics, for example, such as a lens assembly (not shown) to focus an image of the object 150 on the imaging device 120. The imaging device 120 in turn communicates with the computer 140, for example, via the system bus 130. The computer 140 provides overall control for the imaging device 120. In operation, the computer 140 controls the imaging device 120 by, in effect, telling it what to do and when. For instance, the computer 140 provides general input/output (I/O) control that allows one to coordinate control of the imaging device 120 with other electromechanical peripherals of the digital camera 100 (e.g., flash attachment).

Once a photographer or camera user has aimed the imaging device 120 at the object 150 (with or without user-operated focusing) and, using a capture button or some other means, instructed the camera 100 to capture an image of the object 150, the computer 140 commands the imaging device 120 via the system bus 130 to capture an image representing the object 150. The imaging device 120 operates, in essence, by capturing light reflected from the object 150 and transforming that light into image data. The captured image data is transferred over the system bus 130 to the computer 140 which performs various image processing functions on the image data before storing it in its internal memory. The system bus 130 also passes various status and control signals between the imaging device 120 and the computer 140. The components and operations of the imaging device 120 and the computer 140 will now be described in greater detail.

B. Image Capture on Imaging Device

Figure 2A:
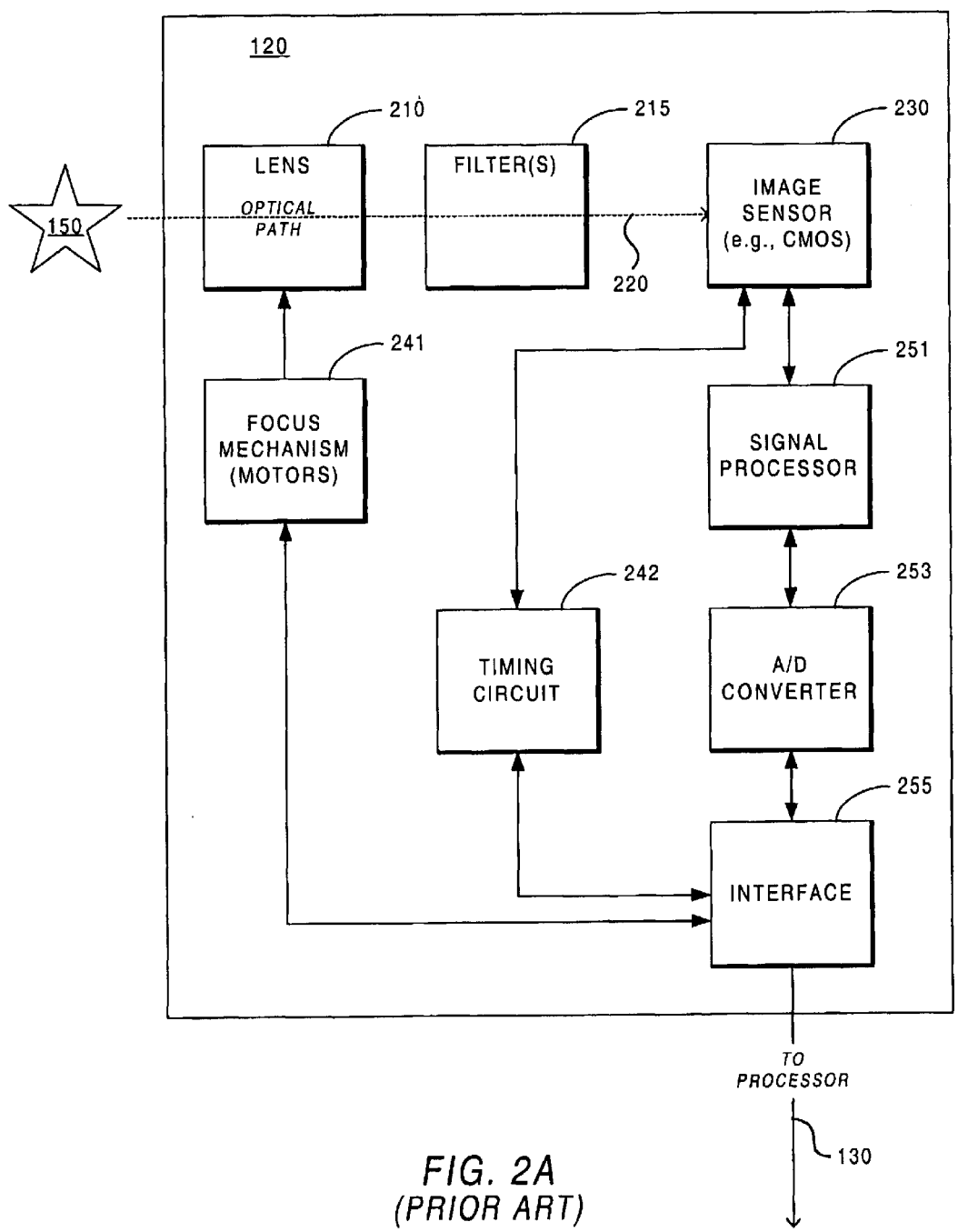
FIG. 2A is a block diagram of a conventional digital imaging device.

FIG. 2A is a block diagram of a conventional digital imaging device 120. As shown, the imaging device 120 comprises a lens 210 having an iris, one or more filter(s) 215, an image sensor 230 (e.g., CMOS, CCD, or the like), a focus mechanism (e.g., motors) 241, a timing circuit 242, a signal processor 251 (e.g., analog signal processor), an analog-to-digital (A/D) converter 253, and an interface 255. The operation of these components will now be described.

In operation, the imaging device 120 captures an image of the object 150 via reflected light impacting the image sensor 230 along optical path 220. The lens 210 includes optics to focus light from the object 150 along optical path 220 onto the image sensor 230. The focus mechanism 241 may be used to adjust the lens 210. The filter(s) 215 preferably include one or more color filters placed over the image sensor 230 to separate out the different color components of the light reflected by the object 150. For instance, the image sensor 230 may be covered by red, green, and blue filters, with such color filters intermingled across the image sensor in patterns ("mosaics") designed to yield sharper images and truer colors.

While a conventional camera exposes film to capture an image, a digital camera collects light on an image sensor (e.g., image sensor 230), a solid-state electronic device. The image sensor 230 may be implemented as either a charged-coupled device (CCD) or a complementary metal-oxide semiconductor (CMOS) sensor. Both CMOS and CCD image sensors operate by capturing light on a grid of small cells known as photosites (or photodiodes) on their surfaces. The surface of an image sensor typically consists of hundreds of thousands of photosites that convert light shining on them to electrical charges. Depending upon a given image, varying amounts of light hit each photosite, resulting in varying amounts of electrical charge at the photosites. These charges can then be measured and converted into digital information. A CCD sensor appropriate for inclusion in a digital camera is available from a number of vendors, including Eastman Kodak of Rochester, N.Y., Philips of The Netherlands, and Sony of Japan. A suitable CMOS sensor is also available from a variety of vendors. Representative vendors include STMicroelectronics (formerly VSLI Vision Ltd.) of The Netherlands, Motorola of Schaumburg, Ill., and Intel of Santa Clara, Calif.

When instructed to capture an image of the object 150, the image sensor 230 responsively generates a set of raw image data (e.g., in CCD format for a CCD implementation) representing the captured object 150. In an embodiment using a CCD sensor, for example, the raw image data that is captured on the image sensor 230 is routed through the signal processor 251, the analog-to-digital (A/D) converter 253, and the interface 255. The interface 255 has outputs for controlling the signal processor 251, the focus mechanism 241, and the timing circuit 242. From the interface 255, the image data passes over the system bus 130 to the computer 140 as previously illustrated at FIG. 1. The operations of the computer 140 in processing this image data will now be described.

C. Image Processing

Figure 2B:
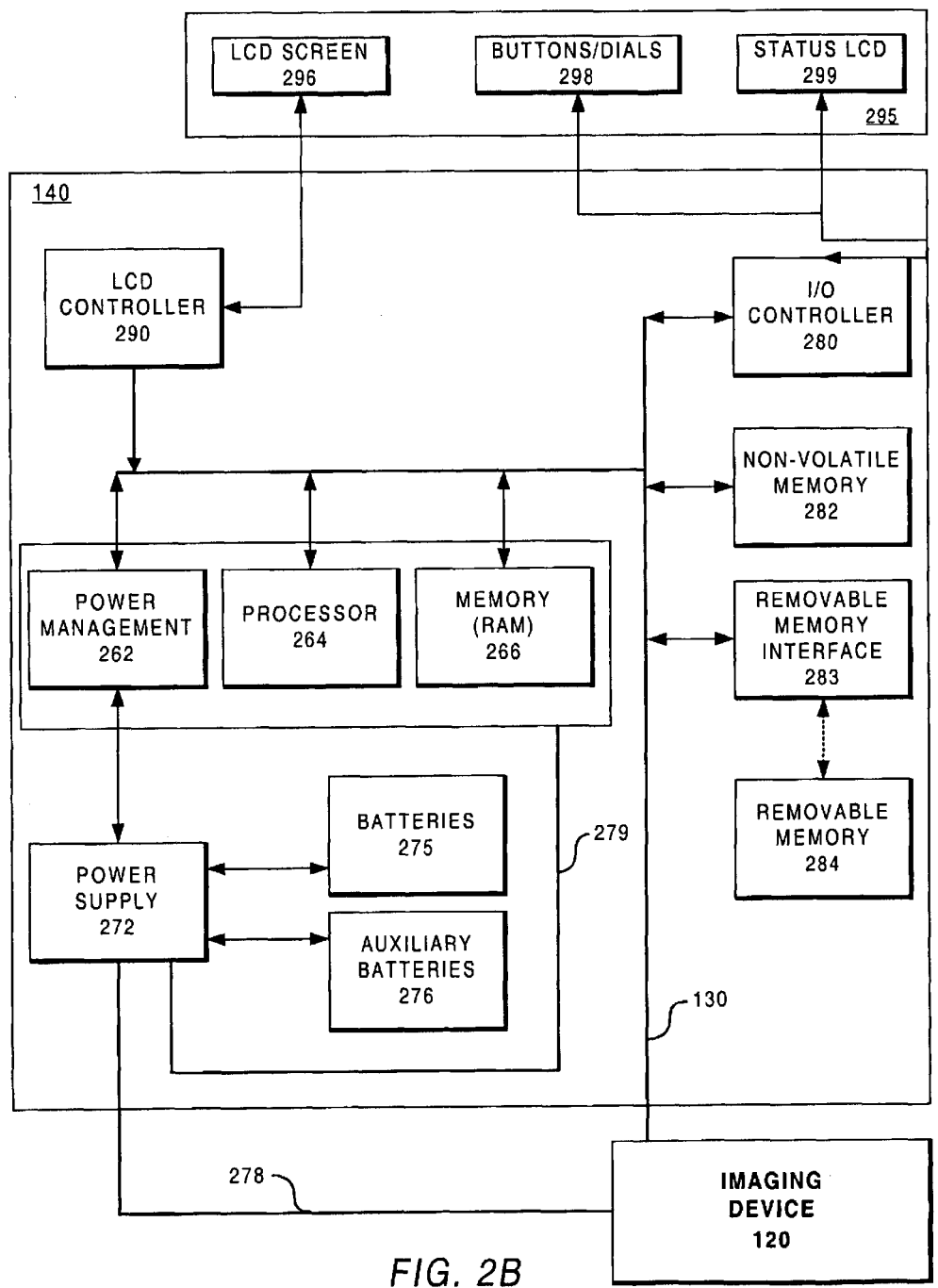
FIG. 2B is a block diagram of a conventional onboard processor or computer provided for directing the operation of the digital camera and processing image data.

A conventional onboard processor or computer 140 is provided for directing the operation of the digital camera 100 and processing image data captured on the imaging device 120. FIG. 2B is a block diagram of the processor or computer 140. As shown, the system bus 130 provides connection paths between the imaging device 120, an (optional) power management 262, a processor (CPU) 264, a random-access memory (RAM) 266, an input/output (I/O) controller 280, a non-volatile memory 282, a removable memory interface 283, and a liquid crystal display (LCD) controller 290. Removable memory 284 connects to the system bus 130 via the removable memory interface 283. Alternately, the camera 100 (and therefore the onboard computer 140) may be implemented without the removable memory 284 or the removable memory interface 283. The power management 262 communicates with the power supply 272. Also illustrated at FIG. 2B is a camera user interface 295 which is electrically connected to the LCD controller 290 and the input/output controller 280. Each of these components will now be described in more detail.

The processor (CPU) 264 typically includes a conventional processor device (e.g., microprocessor) for controlling the operation of camera 100. Implementation of the processor 264 may be accomplished in a variety of different ways. For instance, the processor 264 may be implemented as a microprocessor (e.g., MPC823 microprocessor, available from Motorola of Schaumburg, Ill.) with DSP (digital signal processing) logic blocks, memory control logic blocks, video control logic blocks, and interface logic. Alternatively, the processor 264 may be implemented as a "camera on a chip (set)" using, for instance, a Raptor II chipset (available from Conextant Systems, Inc. of Newport Beach, Calif.), a Sound Vision Clarity 2, 3, or 4 chipset (available from Sound Vision, Inc. of Wayland, Mass.), or similar chipset that integrates a processing core with image processing periphery. Processor 264 is typically capable of concurrently running multiple software routines to control the various processes of camera 100 within a multithreaded environment.

The digital camera 100 includes several memory components. The memory (RAM) 266 is a contiguous block of dynamic memory which may be selectively allocated to various storage functions. Dynamic random-access memory is available from a variety of vendors, including, for instance, Toshiba of Japan, Micron Technology of Boise, Id., Hitachi of Japan, and Samsung Electronics of South Korea. The non-volatile memory 282, which may typically comprise a conventional read-only memory or flash memory, stores a set of computer-readable program instructions to control the operation of the camera 100. The removable memory 284 serves as an additional image data storage area and may include a non-volatile device, readily removable and replaceable by a camera 100 user via the removable memory interface 283. Thus, a user who possesses several removable memories 284 may replace a full removable memory 284 with an empty removable memory 284 to effectively expand the picture-taking capacity of the camera 100. The removable memory 284 is typically implemented using a flash disk. Available vendors for flash memory include, for example, SanDisk Corporation of Sunnyvale, Calif. and Sony of Japan. Those skilled in the art will appreciate that the digital camera 100 may incorporate other memory configurations and designs that readily accommodate the image capture and processing methodology of the present invention.

The digital camera 100 also typically includes several interfaces for communication with a camera user or with other systems and devices. For example, the I/O controller 280 is an interface device allowing communications to and from the computer 140. The I/O controller 280 permits an external host computer (not shown) to connect to and communicate with the computer 140. As shown, the I/O controller 280 also interfaces with a plurality of buttons and/or dials 298, and an optional status LCD 299, which in addition to the LCD screen 296 are the hardware elements of the user interface 295 of the device. The digital camera 100 may include the user interface 295 for providing feedback to, and receiving input from, a camera user, for example. Alternatively, these elements may be provided through a host device (e.g., personal digital assistant) for a media capture device implemented as a client to a host device. For an embodiment that does not need to interact with users, such as a surveillance camera, the foregoing user interface components may not be required. The LCD controller 290 accesses the memory (RAM) 266 and transfers processed image data to the LCD screen 296 for display. Although the user interface 295 includes an LCD screen 296, an optical viewfinder or direct view display may be used in addition to or in lieu of the LCD screen to provide feedback to a camera user. Components of the user interface 295 are available from a variety of vendors. Examples include Sharp, Toshiba, and Citizen Electronics of Japan, Samsung Electronics of South Korea, and Hewlett-Packard of Palo Alto, Calif.

The power management 262 communicates with the power supply 272 and coordinates power management operations for the camera 100. The power supply 272 supplies operating power to the various components of the camera 100. In a typical configuration, power supply 272 provides operating power to a main power bus 278 and also to a secondary power bus 279. The main power bus 278 provides power to the imaging device 120, the I/O controller 280, the non-volatile memory 282, and the removable memory 284. The secondary power bus 279 provides power to the power management 262, the processor 264, and the memory (RAM) 266. The power supply 272 is connected to batteries 275 and also to auxiliary batteries 276. A camera user may also connect the power supply 272 to an external power source, as desired. During normal operation of the power supply 272, the main batteries 275 provide operating power to the power supply 272 which then provides the operating power to the camera 100 via both the main power bus 278 and the secondary power bus 279. During a power failure mode in which the main batteries 275 have failed (e.g., when their output voltage has fallen below a minimum operational voltage level), the auxiliary batteries 276 provide operating power to the power supply 276. In a typical configuration, the power supply 272 provides power from the auxiliary batteries 276 only to the secondary power bus 279 of the camera 100.

The above-described system 100 is presented for purposes of illustrating the basic hardware underlying a media capturing and recording system (e.g., digital camera) that may be employed for implementing the present invention. The present invention, however, is not limited to just digital camera devices but, instead, may be advantageously applied to a variety of devices capable of supporting and/or benefiting from the methodologies of the present invention presented in detail below.

D. System Environment

Figure 3:
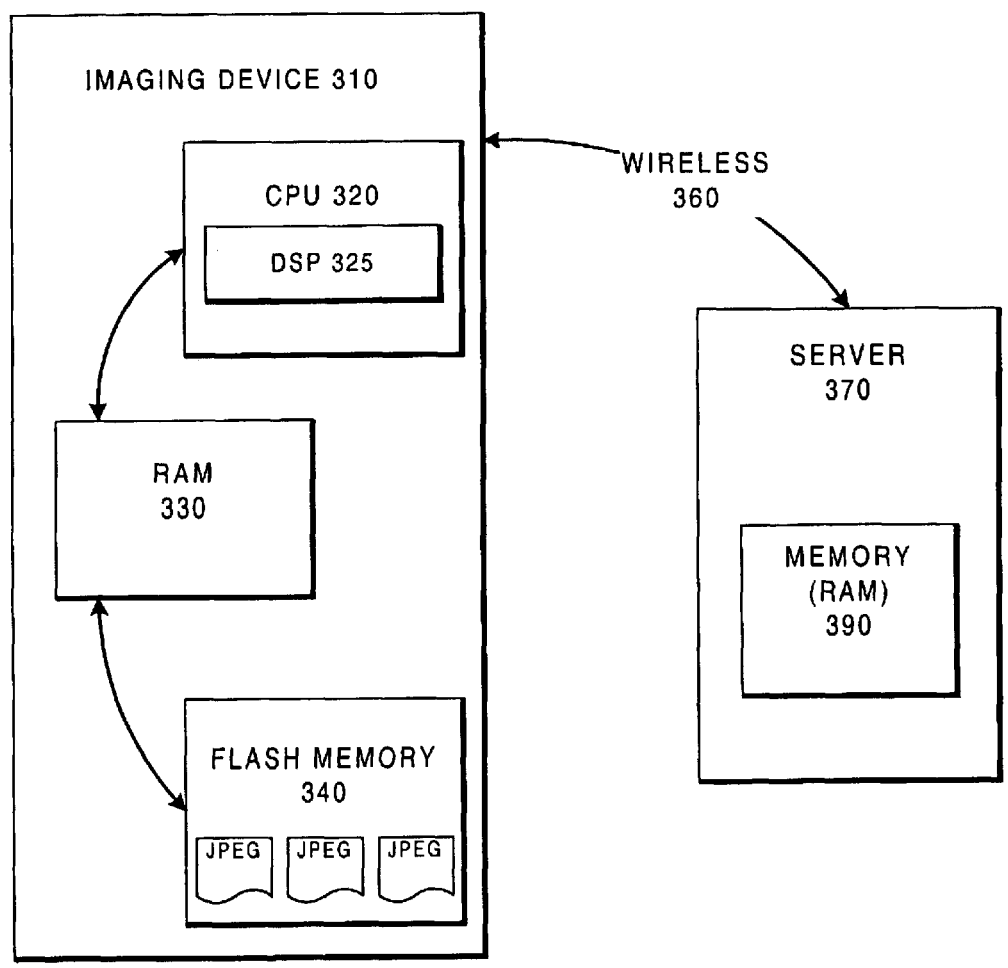
FIG. 3 is a block diagram illustrating an exemplary wireless connectivity environment in which the present invention is preferably embodied.

FIG. 3 illustrates an exemplary wireless connectivity environment 300 in which the present invention is preferably embodied. As shown, environment 300 includes an imaging device 310 (e.g., a digital camera, such as digital camera 100) that includes a central processing unit (CPU) 320 including a dynamic signal processor (DSP) unit 325, a random access memory (RAM) 330 (e.g., DRAM, SRAM, or the like), and a flash memory 340 for storing one or more compressed images. Basic operation of the image device 310 is as follows. A user operating imaging device 310 may take one or more digital images (pictures) and store the image files in flash memory 340 on the imaging device 310. Camera-side processing (e.g., compression) of the image is handled by DSP unit, working in conjunction with working memory (i.e., RAM 330). After processing, images may then be sent via wireless network 360 to a server computer 370 (e.g., on the Internet). At the server 370, the image data received from the imaging device 310 may be retrieved into memory (RAM) 390 (e.g., DRAM, SRAM, or the like) for additional processing (e.g., overlaying graphics). The processed image may then be stored on server 370, or transferred back to the original device (e.g., camera 100), or transferred to other devices, as desired II. Dynamic Viewport Layering A. Introduction Content creators want to create interesting content to add to user pictures. For example, content creators may want to layer user pictures with interesting text or interesting animation. This entails creating content on the fly. However, when a content creator creates content on the fly, the creator faces the additional problem of correctly displaying or rendering the content on devices with different display characteristics. The approach of the present invention is to create a solution that allows one to describe what has to happen in the final presentation. For example, an exemplary description would indicate that an image should be displayed with a frame, with animation overlaid on the image, and with the text "Happy Birthday" displayed on top. In this manner, the solution allows the image to be correctly displayed on devices with different display characteristics.

More particularly, the present invention applies a two-pronged approach. First, the approach of the present invention is to provide a description language that allows one to specify how the layering is to be performed. In the currently preferred embodiment, the description language conforms to XML format and provides a hierarchical description of the layers that form a given image. The different layers include images (e.g., bitmaps), animations, text, vector graphics, and the like. The description language includes a syntax that allows one to describe how to compose the different layers together and how to display those layers in a viewport. The description language does not specify an exact layout but, instead, accommodates the constraints of the various target devices. A given description for a particular image is resident on the server; it is not sent to the target device. Instead, the target device receives the final encoded format (image). Thus, the description language accommodates for encoding constraints imposed by a particular target device.

The second prong of the approach of the present invention is to dynamically reshape or reconfigure the viewport, so that the image is correctly rendered at the target device. Consider a set of device constraints for a given target device. The constraints will specify certain limits, such as maximum bits allowed per pixel (e.g., 8 bits per pixel), maximum screen size (e.g., 100 pixels by 100 pixels), and the like. In accordance with the present invention, the viewport is dynamically reconfigured to fit the constraints of the then-current target device. Moreover, multiple constraints must usually be satisfied. For example, a target device may specify a maximum image size (e.g., 5K). In order to accommodate that constraint, it may be necessary to decrease the bit depth (i.e., bits per pixel). The approach of the present invention entails satisfying a device's constraints mutually, so that, for example, an image's bit depth may be varied to 4 bits per pixel to accommodate the 5K file size constraint. However, the bit depth would not be allowed to exceed 8 bits per pixel (i.e., the maximum bit depth supported by the target device). All told, there are a variety of constraints or parameters that could potentially be adjusted to dynamically match the logical viewports (and therefore the image) to the target device.

B. Basic Methodology

Figure 4:
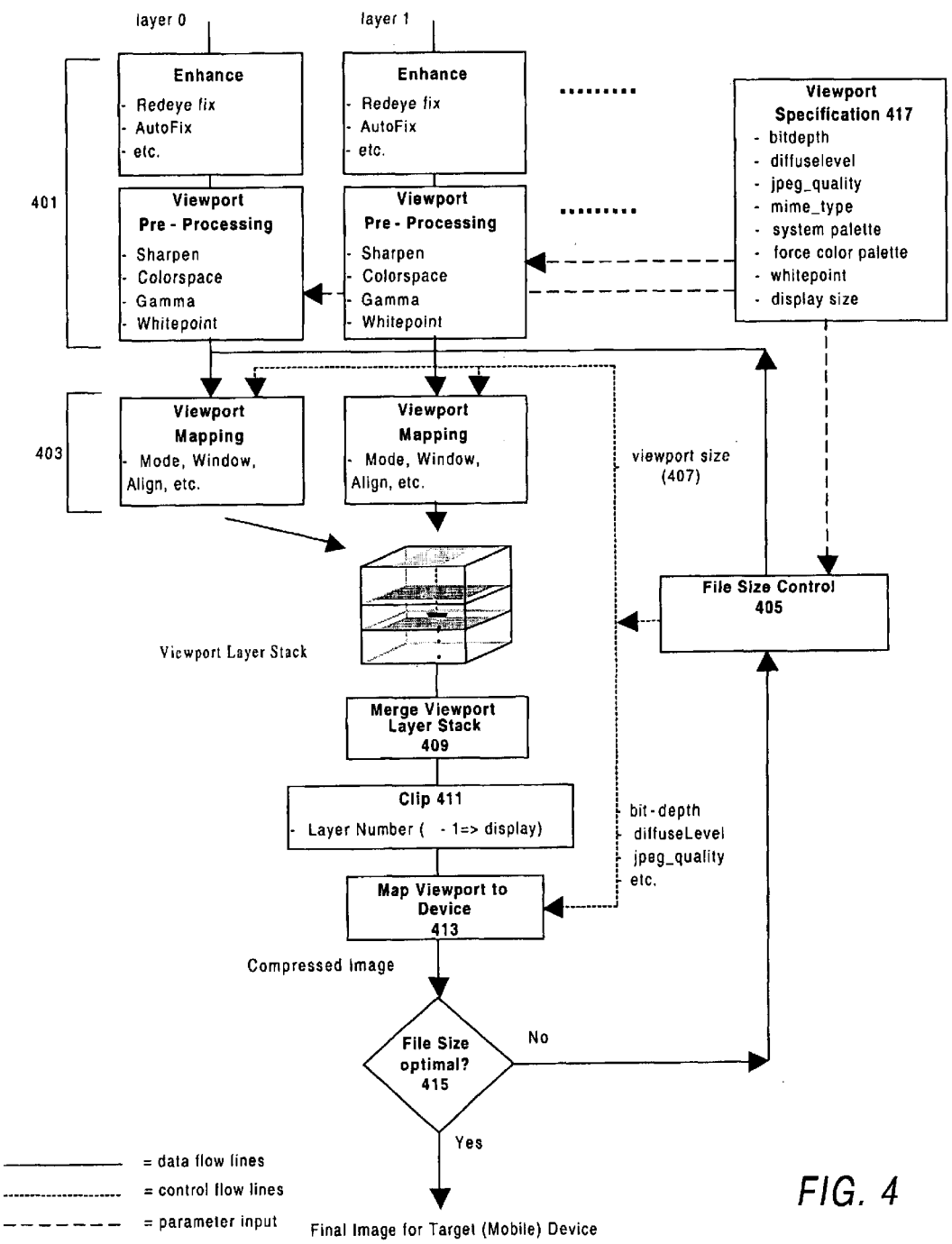
FIG. 4 is a diagram illustrating an iterative optimization/customization method of the present invention that is used to meet target device constraints while maintaining good image quality.

The present invention provides an iterative optimization (customization) method that is used to meet the constraints of target devices while maintaining good image quality. As shown at 401 in FIG. 4, a layered approach is used where each layer initially flows through two basic blocks: Enhance and Viewport preprocessing. The former represents enhancements like red-eye reduction, contrast adjustments, and the like. The latter represents logic where the viewport color and appearance constraints are compensated for by the use of color corrections, gamma, sharpening, and the like.

At the end of the foregoing, the layers (e.g., Layer 0 and Layer 1) are ready to be mapped to the Viewport, as shown at 403. A File Size Control block 405, which communicates with a Viewport Specification component 417, specifies the Viewport Size 407 for this mapping. The Viewport size may be larger than the target display (e.g., due to scrolling capability). The layers are merged after mapping, as indicated at 409. The next step in the process is clipping the Viewport to a clip-path, at 411. The clip-path corresponds to the Viewport unit rectangle (0.0,0.0,1.0,1.0), but it can also be specified to be one of the rendered layers. The clipped rectangle is then encoded per the device constraints, such as color-depth, encoding method, system palette, and the like. Mapping 413 represents this operation. If the resultant file size meets the file size constraints (tested at 415), then the image is returned to the target (e.g., mobile) display. Otherwise the file size control block re-sizes the viewport and reinitiates, viewport mapping, merging, and the like, as indicated by the loop back to the File Size Control block 405.

C. Image Transform API

The following describes the interface for specifying image transformations. To make effective use of the interface, it is useful to understand the imaging model used by the current invention which is based on a layering paradigm. The layers may include, for example, image, text, and vector graphics layers. Layers have spatial and temporal attributes.

1) Spatial layering: The layers have an "order" spatial attribute that specifies how they are stacked relative to each other. Additionally, a Viewport_map child-element specifies the sub-region of the Viewport that the layer is mapped to.

2) Temporal layering: The layers have temporal attributes, such as start_time time, duration, etc. that describe how they are arranged in time.

1. Spatial Layering

Figure 5A:
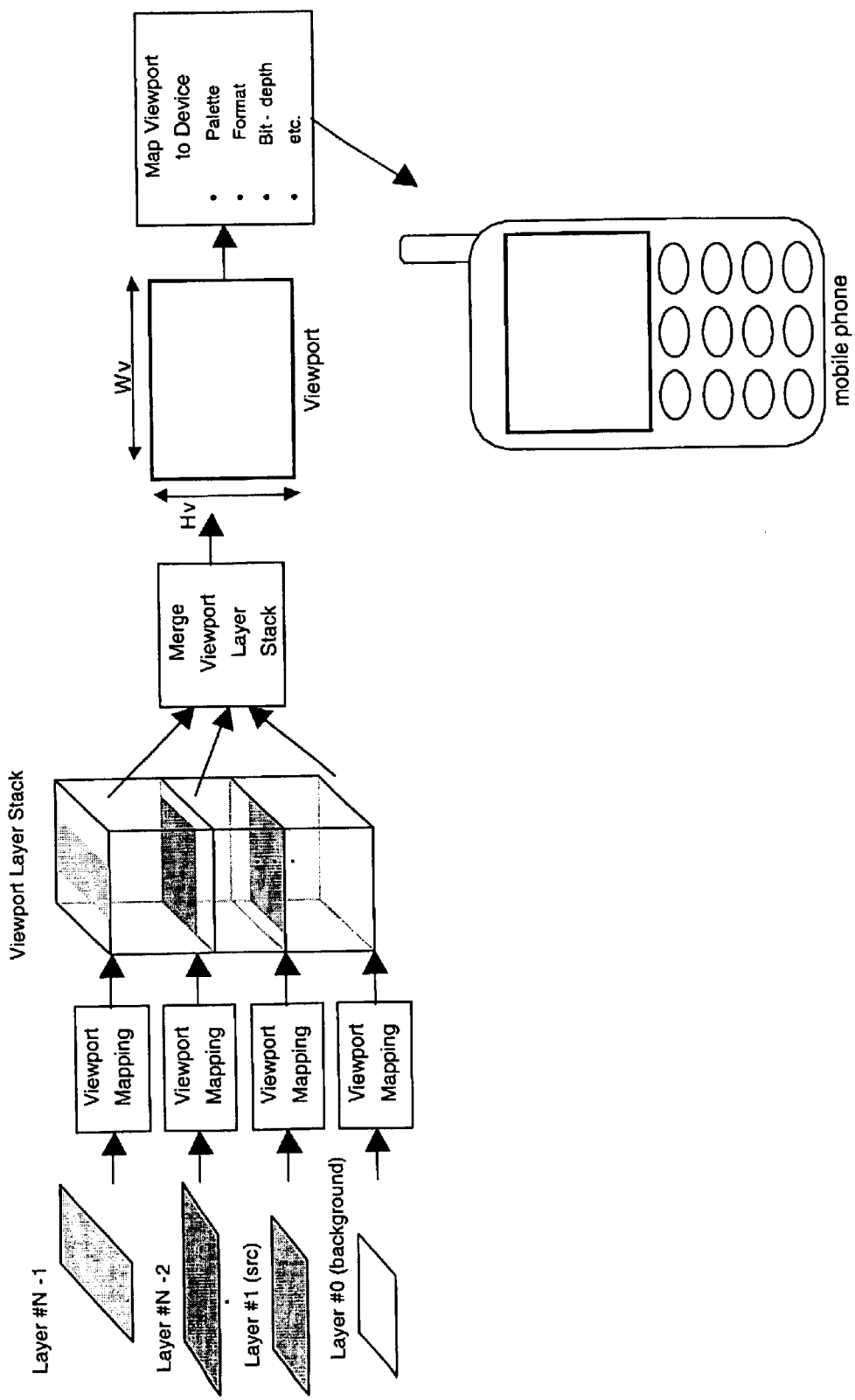
FIG. 5A is a diagram illustrating a layering API and is provided to describe how to combine various layers.

The image transformation API is a layering API that describes how to combine various layers (image, text, animation, etc.) to create special effects. FIG. 5A shows the layering pipeline (ignoring temporal layering for now):

1) First the layers are rendered.
2) The layers are then mapped and stacked on the Viewport. The Viewport is a virtual rectangle whose dimensions are determined by the target display dimensions and the layers' mapping method.
3) The layer stack is merged in the Viewport.
4) The merged Viewport image is formatted to match the requesting client's display constraints (like bit-depth, palette, file format, etc.).
5) The formatted image is then returned to the client.
6) The client displays the formatted image on its display.

Figure 5B:
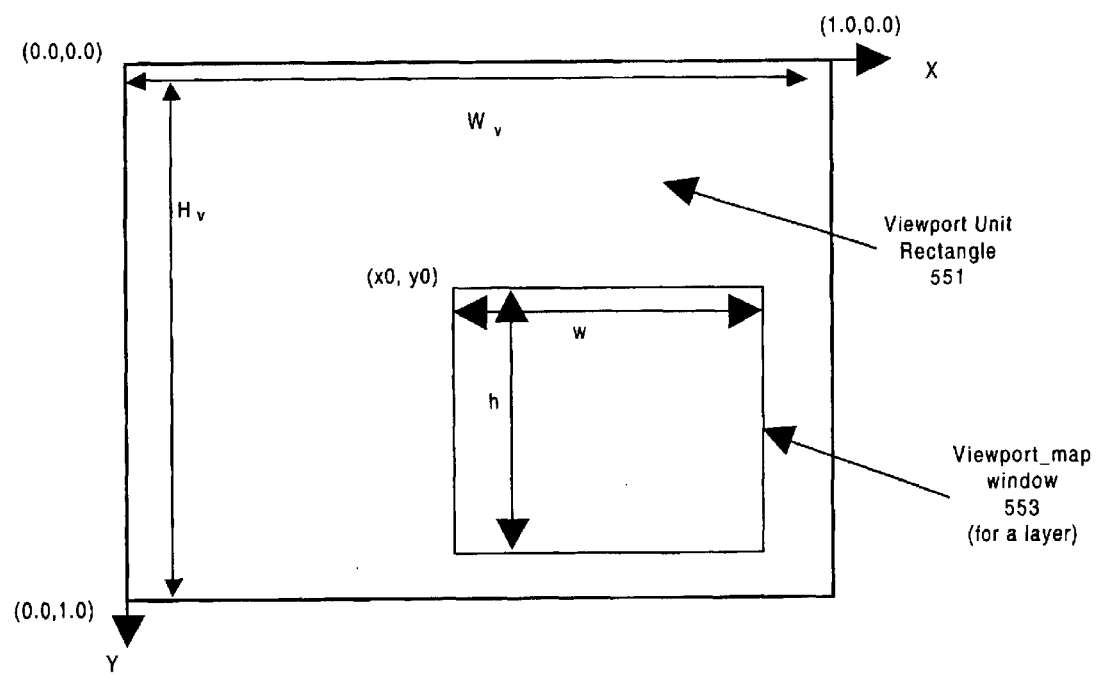
FIG. 5B is a diagram illustrating a Viewport coordinate system that is preferably employed.

The Viewport coordinate system is a "normalized" system (FIG. 5B), wherein:

The origin is in the top left corner of the Viewport.
The X axis advances to the right.
The Y axis advances down.
The X coordinates are normalized to Viewport width.
The Y coordinates are normalized to Viewport height.
A "Viewport Unit Rectangle" 551 is defined to be a rectangle that spans the coordinates (0.0, 0.0), (1.0,1.0). Each layer is mapped to the sub-region of the Viewport, per its Viewport_map. An example Viewport map sub-region or window is shown at 553 in FIG. 5B.

2. Temporal Layering

In addition to the spatial "order" attribute, layers also have temporal attributes (all expressed in milliseconds):

1) start_time: This specifies the start time that the layer is presented. The default is 0 ms.
2) duration: The duration for which a layer is presented. The default value is infinity ("INF"). A value of 0 is also interpreted as infinite duration.
3) repeat_period: The periodic rate at which the presentation is repeated. The default value is infinity ("INF"). A value of 0 is also interpreted as infinity. Both values will result in the animation never getting repeated.

3. XML Approach

Layering is achieved using an XML API. In this method the (arg,val) pair "enh=<XML_URL>" specifes an XML URL to use.

EXAMPLE http://eswitch.foo.com/es?src=http://source.foo.com/images/img1.jpg&enh=ht tp://source.foo.com/templates/enhance.xml.

1) The src image (http://source.foo.com/images/img1.jpg) becomes the source layer which is inserted between any background layer (layer number 0) and other layers specified in the XML enhancements file.
2) The XML (configuration) file describes the other layers. Additionally it describes Viewport constraints.
3) The XML enhancement method cannot be used in conjunction with the URL line (arg,val) pairs (i.e., the two methods are mutually exclusive).

4. XML Hierarchy

Figure 5C:
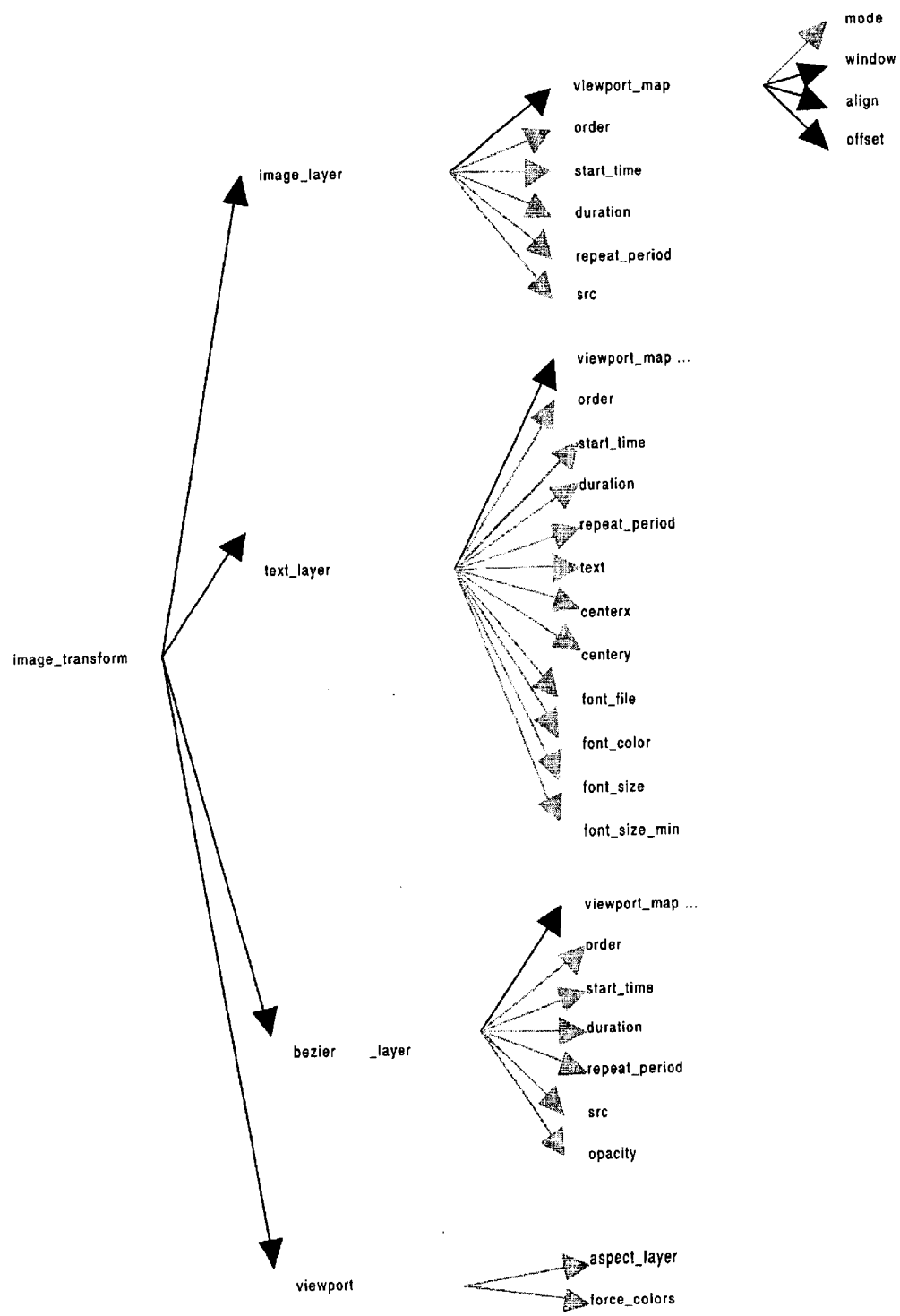
FIG. 5C is a graph illustrating the hierarchy of objects that is used in an XML API of the present invention.

The hierarchy of objects that is used in the XML API is shown in FIG. 5C. The gray lines point to attributes. The dark lines point to elements. In this hierarchy attributes represent simple types and elements represent complex types. Subsequent sections will describe the elements and attributes in the hierarchy in more detail. Certain elements and attributes in the hierarchy are for advanced users and are shown in gray (deemphasized) text.

5. Image Transform

The image transform consists of an element tag to wrap the details of the image layering operation.

TABLE

| Image Transform | | |
|---|---|---|
| Attribute | Valid Values | Description |
| xmlns | "http://www.lightsurf.com/eswitch2/image_transform/1.0" | The namespace and revision of the Image Transform Markup. |
| Child-element | Description | |
| image_layer | An image layer | |
| text_layer | A text layer | |
| bezier Layer | A layer for defining shapes with Bezier curves | |
| Viewport | The Viewport constraints and capabilities that determine how it is mapped to the output. | |

6. Common Properties of Layers

The layers have common properties that describe spatial and temporal behavior.

a) Spatial Properties

A Layer's spatial properties are determined by the "order" attribute and the "viewport_map" child-element.

TABLE

Spatial attributes of a layer

| Attribute | Valid Values | Description |
|---|---|---|
| order | 1 to n | This is a relative number that denotes the spatial order of presentation of the Viewport. Layers with larger order are stacked on top of the layers with smaller order. |

| Child Element | Description |
|---|---|
| Viewport_map | This describes how to map the layer to the Viewport |

Viewport_map is a common element for all layers. This determines how the layer is mapped to the Viewport. The mapping is based on:

Window: This is the region in the Viewport where the layer has to be mapped. By default the window spans the Viewport.

Mode: This describes how to fit the layer into the window. The default is "fit".

The following (advanced) elements are useful to re-position the image after the mapping.

Align: This describes how to align the layer within the window. If not specified—a center alignment is assumed.

Offset: This describes if any offset has to be applied to the layer after it is mapped to the window. If not specified, an offset of (0.0,0.0) is assumed.

TABLE 1

Viewport_map

| Attribute | Valid Values | Description |
|---|---|---|
| mode | One of:<br>Fit (default)<br>Fill<br>Force<br>As-is | A method for mapping a layer to the window. The method defines how the initial mapping of the layer to the window should occur. Areas of the layer that fall outside the window are clipped to the window.<br>Fit: means the layer is scaled so as to fit within the window The layer's aspect ratio is preserved. The image will fill the window only along one dimension.<br>Fill: Fill scales the image to fill the window. Portions of the image may get cropped.<br>Force: will scale and alter the aspect ratio of the layer to fill the window.<br>As-is: will not perform any scaling during the mapping.<br>Fit-to-width: means that the layer's width is resized to Viewport width. The layer's aspect ratio is preserved. The layer may overflow the Viewport along the height (and thereby get cropped |

| Child Element | Usage | Description |
|---|---|---|
| window | <window<br>x = "<LT_X>"<br>y = "<LT_Y>"<br>width = "<WIDTH>"<br>height = "<HEIGHT>"<br>/> | A sub-region of the Viewport in which to map a layer. The (x,y) attributes define top-left corner, and the width and height attributes define the size.<br><LT_X>: The left-top x coordinate. Defaults to 0.0<br><LT_Y>: The left-top y coordinate. Defaults to 0.0<br><WIDTH>: width of window. Defaults to 1.0<br><HEIGHT>: height of window. Defaults to 1.0 |
| Align | <align<br>xalign = "<ALIGNX>"<br>yalign = "<ALIGNY>"<br>/> | This child element describes how the layer should be aligned in the window in the X and Y axes during mapping.<br><ALIGNX>: can be one of "left", "right", or "center". Defaults to "center".<br><ALIGNY>can be one of "top", "bottom", or "center". Defaults to "center". |
| Offset | <offset<br>x = "<OFFSET_X>"<br>y = "<OFFSET_Y><br>/> | The amount to offset the layer after mapping and alignment.<br><OFFSET_X>: Amount to offset in X direction. Defaults to 0.0.<br><OFFSET_Y>: Amount to offset in Y direction. Defaults to 0.0<br>NOTE: The layer is clipped to the viewport mao window after mapping, alignment, and offset, i.e., any portion of the layer that falls outside the window will not be visible. | b) Temporal Properties

The temporal attributes: start_time, duration, and repeat_period, are supported by all layers.

TABLE

Temporal properties of a layer

| Attribute | Valid Values | Default | Description |
|---|---|---|---|
| start_time | >= 0 ms | 0 ms | Start time of layer's presentation. |
| duration | >0 ms | INFINITY | Duration of presentation. |
| repeat_period | | 0 ms | Layers should satisfy the following constraint. Start_time + duration <= repeat_period |

7. Image Layer

The image layer's attributes and child-elements determine how it is:

Created
Mapped to a window within the Viewport.

TABLE

Attributes and elements of an image layer

| Attribute | Valid Values | Default | Description |
|---|---|---|---|
| order | See Section 6 | | |
| start_time | | | |
| duration | | | |
| repeat_period | | | |
| src | A URL | | The source image |

| Child Element | Description |
|---|---|
| Viewport_map | This describes how to map the layer to the Viewport | a) Source Image Layer

The image specified by the "src=<IMAGE_URL>" (arg, val) pair becomes the "source" layer. This layer is inserted between any background (layer order 0) and the remaining layers. This layer has default attribute and child-element values for the Viewport_map.

8. Text Layer

This layer supports text rendition.

TABLE

Attributes and elements of Text layer

| Attribute | Valid Values | Default | Description |
|---|---|---|---|
| order | See above | | |
| start_time | | | |
| duration | | | |
| repeat_period | | | |
| text | UTF-8 unicode string | None | The text string is defined as an UTF-8 string. This format can support any character defined by the unicode standard. As long as the font file specified provides a character for the unicode value, the character is supported. |
| centerx | Yes, No | Yes | Centering in the X direction. A value of "No" will align text to the left border. |
| centery | Yes, No | Yes | Centering in the Y direction. A value of "No" will align the text to the bottom border. |
| font_file | A TrueType file name in the Font Directory. | None | The font file must be a TrueType file. This file may be a single face file (*.ttf) or a multiple face TrueType collection (*.ttc) file. |
| font_color | A color | 0x000000 (black) | Color is specified in hex format as 0xRRGGBB (RR = Red, GG = Green, BB = Blue) |
| font_mode | Auto fixed | Auto | auto: The font size is auto determined so as to fit the specified text in the window The font_size_min attribute is enforced. fixed: The font_size is specified in "points" (1 point = 1/64") The font_size_min attribute is ignored. |
| font_size | 4–128 | 12 | The size of the font to use for fixed mode fonts. Specified in points |
| font_size_min | 4+ | 6 | This parameter is useful with the "auto" mode, wherein it can be used to ensure that the font size does not fall below this level, resulting in "intelligible" text even for devices with small displays. |

| Child Element | Description |
|---|---|
| Viewport_map | Map, align, and offset are ignored (i.e. only window element is used). |

9. Bezier Layer

The Bezier Layer is used to overlay vector graphics. The intent of this layer is to support vector graphics with dynamic text insertion capabilities.

TABLE

| Attributes and elements of Bezier layer | | | |
|---|---|---|---|
| Attribute | Valid Values | Default | Description |
| order | See above. | | |
| start_time | | | |
| duration | | | |
| repeat_period | | | |
| src | A URL | Must be specified | A pathname to a file that specifies Bezier curves in Adobe Illustrator AI8 EPS file format. The pathname should have the .eps extension. |
| order | 1 to n | Must be specified | The order defines the stacking of the layers when the final output is generated. Higher numbers are rendered on top of lower numbers. |
| Opacity | 0–100 | 100 | The overall opacity of the graphic |
| Child Element | Description | | |
| Text_box | This describes the text that has to be inserted into the Bezier layer | | |
| Viewport_map | Same as Image Layer | | |

| Text_box element of Bezier Layer | | | |
|---|---|---|---|
| Attribute | Valid Values | Default | Description |
| text | Same as corresponding attributes in Text Layer. | | |
| centerx | | | |
| centery | | | |
| font_file | | | |
| font_color | | | |
| font_mode | | | |
| font_size | | | |
| font_size_min | | | |
| Child Element | Description | | |
| bounding_box | This is the bounding box for the text, specified in the point co-ordinate space of the Adobe Illustrator file.<br>Usage: <bounding_box x = "<llx>" y = "<ury> width = "<width>" height = "<height>".<br><llx>: The lower left X coordinate in points.<br><ury>: The upper right Y coordinate in points.<br><width>: The width of the bounding box in points<br><height>: The height of the bounding box in points.<br>Procedure for determining text bounding box:<br>Open the graphic of interest in Adobe Illustrator.<br>Choose: File->Document Setup->Units->Points<br>Draw the text bounding box area with the Rectangle tool.<br>Select the rectangle with the Selection tool.<br>This highlights the rectangle and shows the bounding box information in the "info: palette. This is the bounding box information that has to be entered in the XML layer specification. The (X, Y, W, H) in the info palette correspond to llx, lly, width, height.<br>Delete the rectangle - it is no longer needed (it was only useful to determine the text bounding box). | | |

10. Viewport

Once the layers are mapped onto the Viewport and merged, the resultant image is mapped to the client's preferred image format per constraints specified in the Viewport element.

TABLE

Viewport element

| Attribute | Valid Values | Default | Description |
|---|---|---|---|
| aspect_layer | An image layer order number or −1 | Lowest image layer | The aspect (or "ancho") layer determines the layer that is used as an anchor when positioning all the other layers. The aspect layer determines the aspect ratio of the Viewport (see above). |
| force_colors | A URL | Colors are not forced. | This element defines the color to be forced. The set of colors to be forced is specified in one of the following formats (see above):: ACT (.act): Adobe Active Table Format (.act). GIF (.gif) PNG (.png | a) Aspect/Anchor Layer

The current invention sets the Viewport's width to the target device's width. But the Viewport height is determined based on the aspect ratio as defined by the aspect_layer.

aspect_layer==−1: This is the simplest case. In this case the aspect ratio is the same as that of the target device's display.

Example: The target mobile device is 100×120. The current invention will then create a Viewport that is 100×120.

aspect_layer==order number of some image layer: The image layer's aspect ratio determines the height of the Viewport.

Example: The image is 640×480. The mobile device is 100×100. The current invention will then create a Viewport that is 100×75. Since the coordinate system is normalized to the Viewport, all layering will be then relative to this image layer.

aspect_layer unspecified (default): If the aspect layer is unspecified the "lowest" (in terms of "order") image layer is used as the aspect layer. If there are no image layers, the aspect_layer is set to −1.

Though initially the Viewport dimensions are determined per the method described above, the dimensions may be adjusted to satisfy file size constraints. The aspect ratio is preserved when the Viewport is resized.

b) Force_Colors

The set of colors to be forced is specified in one of the following formats:

1) ACT (.act): Adobe Active Table Format (.act). This defines a color table. The set of colors in the color table are used.
2) GIF (.gif): The set of colors is the first color palette that is present in the GIF image.
3) PNG (.png): The set of colors is the first color palette that is present in the PNG image.

Mobile devices typically have one of the following color modes:

7) True Color: In this mode the system is capable of displaying any color. Force_colors has no effect in this case.
8) Indexed Color: In this mode the system is capable of displaying a limited number of colors. There are two sub-modes withing the indexed color mode:
   a. Fixed palette: Devices with a fixed palette are inflexible and cannot accommodate "force_colors". The force_colors directive is ignored for these devices.
   b. Adaptive palette: A large class of devices can accommodate a small set of colors (say, 256), but the colors can be any color. Force_colors is most useful in this case.

If the system can support more colors than force_colors, then all of the colors in force_colors are used. If the system can support fewer colors than force_colors then a subset of the force_colors are used.

11. Class Definitions

The C++ class definitions of the ImageTransform class, the ImageLayer class and Viewport class are shown here.

a) ImageTransform

```
/**
 * class ImageTransform
 **/
class ImageTransform
{
        friend class Layer;
        friend class Viewport;
public:
        / / / Constructor
        ImageTransform( ) ;
        / / / Destructor
        ~ImageTransform( ) ;
        / / / Get the viewport object
        Viewport* GetViewport( ) ;
        / / / Set the Output File Name
```

-continued

```
            ITERR SetOutputFileName(const std: :string & outFileName) ;
            / / / Creating a layer
            ImageLayer*    CreateImageLayer    (int32_t StackOrder) ;
            TextLayer*     CreateTextLayer     (int_32t StackOrder) ;
            BezierLayer*   CreateBezierLayer   (int32_t StackOrder) ;
            / / / Get the aspect/anchor layer. This is the layer that determines
            / / / "anchor" when displaying all other layers.
            Layer *GetAspectLayer ( ) ;
            / / / --------Encoding--------------------------
    / / / Enable (or disable) encoding MIME type image/gif images
    / / / compressed with the LZW algorithm
            void EnableLzwGifEncoding(bool enable = true) ;
    / / / Enable (or disable) decoding MIME type image/gif images
    / / / compressed with the LZW algorithm
            void EnableLzwGifDecoding(bool enable = true) ;
               / / / --------Rendering--------------------------
               / / / Render the image transform
               ITERR   Render( ) ;
    / / / Getting rendered parameters
    int32_t   GetRenderedWidth( ) ;
    int32_t   GetRenderedHeight( ) ;
    int32_t   GetRenderedContentLength( ) ;
    std: :string GetRenderedMimeType( ) ;
/ / / Typedef for a UrlAccess call-back which is plugged into the
/ / / image transform object to access media by URL - It returns the
/ / / HTTP status code from the access.
typedef int32_t (UrlAccessFunction) (std: :string url,
                                    std: :ostream * fromUrlStream,
                                    void * ref.
                                    std: :string * resStr = NULL) ;
/ / / Set the Url Accessor funciton which is called to accessing
/ / / media by URL
void SetUrlAccessFunction(UrlAccessFunction * fxn, void * ref = NULL) ;
/ / Anchor to Display Mapping Mode. This mode decides how an anchor
/ / layer is mapped to the display:
/ / CLAMP_TO_WINDOW:     Clamp to fit withing display window
/ / CLAMP_TO_WIDTH:      Allow height to exceed display height,
/ /                      but clamp to Width
typedef enum
{
    CLAMP_TO_WINDOW,
    CLAMP_TO_WIDTH
} AnchorToDisplayMapMode;
ITERR SetAnchorToDisplayMapMode(AnchorToDisplayMapMode Mode) ;
AnchorToDisplayMapMode GetAnchorToDisplayMapMode( ) const;
private:
     / / Fetch a "media" or other object and return a temp file name
std: :string FetchUrlObject(const std: :string& url) ;
/ / Private rendering functions:
/ / Load the layers
ITERR   LoadLayers( ) ;
/ / Just size the layers
ITERR   SizeLayers( ) ;
/ / Compute Viewport size - previous to enforcing file size constraint
ITERR   ComputeViewportSize(int32_t *pWidth, int32_t *pHeight) ;
/ / Do the actual rendering to output
ITERR   RenderOutput( ) ;
/ / Internal rendering to memory
ITERR   RenderToMemory(IMG_IOHANDLER *pIO) ;
/ / Render with no output: Useful to compute Rendered parameters
ITERR   RenderParameters( ) ;
/ / Setting rendered parameter values
ITERR       SetRenderedWidth(int32_t Width) ;
ITERR       SetRenderedHeight(int32_t Height) ;
ITERR       SetRenderedContentLength (int32_t ContentLength) ;
ITERR       SetRenderedMimeType(IMG_type MimeType) ;
/ / / Animation
void SetAnimatedFlag(bool AnimatedFlag) ;
bool GetAnimatedFlag( ) const;
        / / / The layers to be stacked
typedef std: :map<int32_t, Layer *> LayerMap;
LayerMap                        mLayerMap;
        / / / Viewport
        Viewport                    mViewport;
        / / / Output filename
        std: :string                 mOutFileName;
/ / / Parameters that are set after rendering
int32_t                     mRenderedWidth;
int32_t                     mRenderedHeight;
```

-continued

```
    int32_t                     mRenderedContentLength;
    IMG_type                    mRenderedMimeType;
    /// temporary file streams for input media
    std: :vector<LSCC: :FileStream>  mFileStreams;
    UrlAccessFunction *         mUrlAccessFxn;
    void *                      mUrlAccessRef;
    // The enable which allows MIME types of image/gif to be decoded
    // using LZW decompression
    bool                        mEnableLzwGifDecode;
    // animation
    bool                        mAnimatedFlag;
    // Anchor to display mapping mode
    AnchorToDisplayMapMode      mAnchorToDisplayMapMode;
};
``` b) Layer Class

The layer class is the base class from which all layers (image, text, etc.) are derived.

```
/**
 * class Layer
 **/
class Layer
{
public:
        /// Layer Type
        typedef enum
        {
            LAYER_TYPE_IMAGE,
            LAYER_TYPE_TEXT,
            LAYER_TYPE_BEZIER,
            LAYER_TYPE_ANIMATION,
            LAYER_TYPE_UNKNOWN
        } LayerType;
        /// Constructor
        Layer(class ImageTransform * imgXfm) ;
        /// Destructor
    virtual ~Layer( ) ;
    /// Get the type of layer
    virtual LayerType GetLayerType( ) const;
    /// Set the layer order - layers with a larger order number will
    /// be more visible when the layers are stacked (i.e. stacked
    /// later)
    void SetLayerNumber(int16_t number) ;
    /// Get the layer order number.
    int32_t GetLayerOrder( ) const;
    /// Set opacity
    ITERR SetOpacity(double OpacityPercent) ;
    /// Get Opacity
    double GetOpacity( ) const;
    /// Get aspect ratio
    virtual ITERR GetAspectRatio(double *pAspectRatio) const;
    /// Get the layers size (width and height)
    virtual ITERR GetSize(int32_t *pWidth, int32_t *pHeight) const;
    /// Decode a layer
    virtual ITERR Load(const Viewport & viewport) ;
    /// Size a layer
    virtual ITERR Size(const Viewport & viewport) ;
    /// Enhance
    virtual ITERR Enhance( ) ;
    /// EnhanceSize
    virtual ITERR EnhanceSize( ) ;
    /// Apply Preprocessing to accomodate viewport constraints
    virtual ITERR PreProcess(const Viewport & viewport) ;
    /// Render all the frames in a Layer
    virtual ITERR Render(const Viewport & viewport) ;
    /// Get the count of the number if frames this layer has
    virtual uint32_t GetFrameCount( ) const;
    /// Get a pointer to a particular frame
    virtual const ImageFrame * GetFrame(uint32_t index) const;
    /// Get the viewport Map
    ViewportMap * GetViewportMap( ) ;
    /// Set the identifier for this layer
```

```
        void SetId(const std: :string & id) ;
        / / / Get the identifier for this layer
        std: :string GetId( ) const;
        / / / Set the time to start displaying this frame (aka Time of
        / / / arrival [TOA]) - time is in ms
        void SetStartTime(int32_t time) ;
        / / / Get the time to set for starting to displaying the frame
        int32_t GetStartTime( ) const;
        / / / Set the duration this frame will be displayed for - time is in
        / / / ms
        void SetDuration(int32_t time) ;
        / / / Get the duration this frame will be displayed for.
        int32_t GetDuration( ) const;
        / / / Set the display count for how many times to display this frame
        void SetDisplaycount(int32_t count) ;
        / / / Get the display count for this frame.
        int32_t GetDisplayCount( ) const;
        / / / Set the repeat period which is the duration between starting to
        / / / reshow this frame
        void SetRepeatPeriod(int32_t time) ;
        / / / Get the repeat period for this frame.
        int32_t GetRepeatPeriod( ) const;
        / / / Is the layer "animated"
        bool IsAnimated( ) const;
protected:
        / / Is it okay to Load a LZW GIF file
        bool IsLzwGifDecodeOK( ) ;
        / / Fetch a "media" or other object and return a temp file name
        std: :string FetchUrlObject(const std: :string& url) ;
        / / / Opacity of a layer
        double        mOpacity;
        / / / Viewport mapping parameters
        ViewportMap   mViewportMap;
private:
        ImageTransform* mParentTransformObj;
        std: :string   mLayerId;
        int16_t       mLayerNumber;
        uint32_t      mStartTime;      / / / display start (presentatin) time
        uint32_t      mDuration;       / / / display duration (in ms)
        uint32_t      mRepeatPeriod;   / / / repeat period (in ms)
        uint32_t      mDisplayCount;   / / / display count
};
``` c) Image Layer Class
The ImageLayer is derived from the Layer class.

```
/**
 * class ImageLayer
 **/
class ImageLayer : public Layer
{
public:
        / / / Constructor
        ImageLayer(class ImageTransform * imgXfm) ;
        / / / Destructor
        ~ImageLayer( ) ;
        / / / return the layer type (i.e. LAYER_TYPE_IMAGE)
        LayerType GetLayerType( ) const;
        / / / ------- Setting of parameters -------------
        / / / Set the source file name
        ITERR SetSrc(const std: :string & srcFileName) ;
        / / / Set enhancement string
        ITERR SetEnhance(const std: :string & enhanceString) ;
        / / / ------- Getting of parameters -------------
        / / / Get aspect ratio. Call only after image
        / / / has been loaded.
        ITERR GetAspectRatio (double *pAspectRatio) const;
        ITERR GetSize(int32_t *pWidth, int32_t *pHeight) const;
        / / / ------- Processing -------------
        / / / Set the Load Clamp Rectangle, i.e. the image that is loaded
        / / / will be pre-clamped to ClampWidth, ClampHeight. This function
        / / / is typically used to minimize processing overhead, as fewer
        / / / pixels need be processed during subsequent processing.
```

-continued

```
        ITERR   SetLoadClamp(int32_t ClampWidth, int32_t ClampHeight=0) ;
        /// Load a source image
        ITERR   Load(const Viewport & viewport) ;
        /// Size a layer
        ITERR   Size(const Viewport & viewport) ;
        /// Apply enhancements
        ITERR   Enhance( ) ;
        /// Compute the size effects of enhancements
        ITERR   EnhanceSize( ) ;
        /// Apply PreProcessing to accomodate viewport "appearance"
        /// constraints, like color etc.
        ITERR   PreProcess(const Viewport & viewport) ;
        /// Render a ImageLayer
        ITERR   Render(const Viewport & viewport) ;
        /// Get the count of the number if frames this layer has
        uint32_t GetFrameCount( ) const;
        /// Get a pointer to a particular frame
        const ImageFrame * GetFrame(uint32_t index) const;
private:
        /// Is this an LZW TIF Image?
        bool    IsLzwTIF(const std: :string &filenam) ;
        /// Verify if this is a valid "allowed" image (for e.g. LZW
        /// may be disallowed and the image could be LZW GIF
        /// Also Compute the "preclamp" dimensions
        ITERR   VerifyImageAndComputePreclamp (const std: :string &pFileName,
                                int32_t     DisplayWidth,
                                int32_t     DisplayHeight,
                                int32_t     *pClampWidth,
                                int32_t     *pClampHeight) ;
        std: :string    mSrcFileName;
        int32_t         mLoadClampWidth;
        int32_t         mLoadClampHeight;
        std: :string    mEnhanceString;
        IMG_image       mImg;
        ImageFrame      mRenderedImage;
};
``` d) The Viewport Class

```
/**
 * Class Viewport
 **/
class Viewport
{
public:
        /// Constructor
        Viewport(class ImageTransform * parent) ;
        /// Destructor
        ~Viewport( ) ;
        ///-------------Viewport initialization-----------------
        /// Initialization
        ITERR       Init( ) {return ReInit( ) ; } ;
        /// Reinitialization
        ITERR       ReInit ( ) ;
        ///-------------adaptive vs. custom palette
        bool        UseAdaptivePalette ( ) ;
        ///-------------Viewport external params ------
        /// preprocessing parameter - sharpen
        ITERR       SetSharpen(double Sharpen) ;
        double      GetSharpen( ) const;
        /// adaptation: Variable params
        /// Only set the width
        ITERR       SetDisplaySize(int32_t Width) ;
        /// Set the width and height
        ITERR       SetDisplaySize(int32_t Width, int32_t Height) ;
        /// **WARNING*: This returns the raw device display size without
        /// considering any scaling.
        void        GetDisplaySize(int32_t *pWidth, int32_t *pHeight) const;
        /// **WARNING* : This returns the effective display size after
        /// considering any scaling.
        void        GetEffectiveDisplaySize(int32_t *pWidth, int32_t *pHeight)
const;
        /// scaling of display
```

-continued

```
            ITERR       SetDisplaySizeScale(double ScaleX, double ScaleY) ;
            void        GetDisplaySizeScale(double *pScaleX, double *pScaleY)
const;
            /// bits per pixel
            ITERR       SetBitsPerPixel(int32_t BitsPerPixel) ;
            int32_t     GetBitsPerPixel( ) const;
            /// Amount of error diffusion
            ITERR       SetDiffuseLevel(int32_t DiffuseLevel) ;
            int32_t     GetDiffuseLevel( ) const;
            /// quality level for JPEG output
            ITERR       SetJPEGQuality(int32_t JPEGQuality) ;
            int32_t     GetJPEGQuality( ) const;
            /// Maximum file size allowed
            ITERR       SetFileSize(int32_t FileSize) ;
            /// **WARNING* : This returns the raw device file size without
            /// considering any scaling.
            int32_t     GetFileSize( ) const;
            /// **WARNING* : This returns the effective file size after
            /// considering any scaling.
            ITERR       GetEffectiveFileSize (int32_t *pEffFileSize) const;
            ITERR       SetFileSizeScale(double FileSizeScale) ;
            double      GetFileSizeScale( ) const;
            /// Mime type for static (un-animated) output
            ITERR       SetMimeType(const std: :string & mimeType) ;
            IMG_type    GetMimeType( ) const;
            /// Dots per inch of device
            ITERR       SetDPI(double DotsPerInch) ;
            double      GetDPT( ) const;
            /// Color capability of device
            ITERR       SetColorFlag(bool ColorFlag) ;
            bool        GetColorFlag( ) const;
            /// System Palette
            ITERR       SetSystemPalette(const std: :string & sysPalFileName) ;
            char        *GetSystemPalette( ) const;
            /// Force color palette
            ITERR       SetForceColorPalette(const std: :string & fCPalFileName) ;
            char        *GetForceColorPalette ( ) const;
            /// Animation parameter: Mime type for animated output
            ITERR       SetAnimationMimeType(const std: :string & mimeType) ;
            IMG_type    GetAnimationMimeType( ) const;
            /// Animation parameter: Animation capable?
            void        SetAnimationCapable(bool AnimationCapable) ;
            bool        GetAnimationCapable( ) const;
            /// Animation parameter: Animation Max Frames
            ITERR       SetAnimationMaxFrames(const std: :string & MaxFrames) ;
            int32_t     GetAnimationMaxFrames( ) const;
            /// Animation parameter: Animation Max Repeat Count
            ITERR       SetAnimationMaxRepeatCount(const std: :string &
MaxRepeatCount) ;
            int32_t     GetAnimationMaxRepeatCount( ) const;
            /// ------------Viewport: internal params ------
            ITERR       SetViewportSize(int32_t Width, int32_t Height = 0) ;
            void        GetViewportSize(int32_t *pWidth, int32_t *pHeight) const;
            ITERR       SetIntBitsPerPixel(int32_t BitsPerPixel) ;
            int32_t     GetIntBitsPerPixel( ) const;
            ITERR       SetIntDiffuseLevel(int32_t DiffuseLevel) ;
            int32_t     GetIntDiffuseLevel( ) const;
            ITERR       SetIntJPEGQuality(int32_t JPEGQuality) ;
            int32_t     GetIntJPEGQuality( ) const;
            /// Aspect Layer
            ITERR       SetAspectLayerNumber(int32_t LayerNumber) ;
            int32_t     GetAspectLayerNumber( ) const;
            /// Mime type for output
            void        SetOutputMimeType(IMG_type mimeType) ;
            IMG_type    GetOutputMimeType( ) const;
            /// -------------Viewport save to memory-----------------
            ITERR       Save(IMG_IOHANDLER *pIO = NULL) ;
            /// Enable (or disable) encoding MIME type image/gif images
            /// compressed with the LZW algorithm
            void EnableLzwGifEncoding(bool enable = true) ;
            /// Is it okay to do LzwGifEncoding Okay?
            bool IsLzwGifEncodeOK( ) const;
            /// Add the frame to the image frame held by the viewport
            void AddFrame(const ImageFrame * frame) ;
private:
            ///----------- Viewport params: External--------
            ///              Preprocessing
            double           mSharpen;
            ///              adaptation: variable
```

-continued

```
        int32_t         mDisplayWidth;
        int32_t         mDisplayHeight;
        double          mDisplayScaleX;
        double          mDisplayScaleY;
        int32_t         mReqBitsPerPixel;
        int32_t         mReqDiffuseLevel;
        int32_t         mReqJPEGQuality;
        ///     adaptation: fixed
        bool            mColorFlag;
        int32_t         mFileSize;
        double          mFileSizeScale;
        IMG_type        mMimeType;
        double          mDPI;
        std::string     mFCPalFileName; ///force color palette
        std::string     mSysPalFileName;
        IMG_colorPalette mPalette;
        bool            mJPEGThumbSave;
        int32_t         mJPEGThumbClamp;
        int32_t         mjPEGThumbQuality;
        /// Animation parametyers
        bool            mAnimationCapable;
        uint32_t        mAnimationMaxFrames;
        uint32_t        mAnimationMaxRepeatCount;
        IMG_type        mAnimationMimeType;
        /// Output Mime type: Output mime type is set to one of the
        /// mMimeType or mAnimationMimeType based on:
        /// If the image seq. to be rendered has more than one frame
        ///     and the device is animation capable:
        /// then set to mAnimationMimeType
        /// else use mMimeType.
        IMG_type        mOutputMimeType;
        //----------- Viewport parameters: Internal-------
        ///     adaptation: variable
        int32_t         mViewportWidth;
        int32_t         mViewportHeight;
        int32_t         mBitsPerPixel;
        int32_t         mDiffuseLevel;
        int32_t         mJPEGQuality;
        /// The layer that determines the aspect ratio of the viewport.
        /// The significance of this is that the viewport coordinates
        /// are now effectively normalized relative to this layer.
        int32_t         mAspectLayerNumber;
        /// Substitution for transparency for devices that do not support transp.
        uint8           mTrans_R;
        uint8           mTrans_G;
        uint8           mTrans_B;
        /// Drawing Canvas
        double          mCanvasX;
        double          mCanvasY;
        double          mCanvasW;
        double          mCanvasH;
        FrameMap        mFrameMap;
        // The enable which allows MIME types of image/gif to be encoded
        // using LZW compression
        bool            mEnableLzwGifEncode;
        class ImageTransform * mParent;
};
```

12. Layering Examples

The following sub sections show examples of using the XML based layering API.

a) Graphics Overlay

This example shows how to overlay a graphic on a source image under the following constraints:

The image is "fit"ted to the Viewport.

The graphic is pasted as-is on the Viewport in the bottom-right corner.

The requesting URL would be:

http://eswitch.foo.com/es?src=http://source.foo.com/boy jpg&enh=http://source.foo.c om/enhance.xml The enhancement XML would be:

```
<image_transform xmlns="http://www.lightsurf.com/image_transform/1.0">
    <!-- Graphics layer-->
    <image_layer src=http://www.image.com/flower.png order="2">
        <Viewport_map mode="as-is">
            <align xalign="right" yalign="bottom" />
        </Viewport_map>
    </image_layer>
</image_transform>
``` b) Framing

This section is an example of overlaying a frame on an image.

The requesting URL would be:
http://eswitch.foo.com/es?enh=http://source.foo.com/enhance.xml The enhancement XML is shown below:

The aspect_layer attribute of Viewport is set to 2. This forces the Viewport to have the same aspect ratio as image layer 2, i.e. image layer 2.

Image_layer 2 is mapped to the complete Viewport.

Image_layer 1 is mapped to a sub-window that aligns with the transparency in the "flower".

```
image_transform xmlns="http://www.lightsurf.com/image_transform/
1.0">
    <!-- Image layer--->
    <image_layer src=http://www.image.com/boy.jpg order="1">
        <Viewport_map mode="fit">
            <window x="0.45" y="0.16" width="0.37" height="0.29" />
        </Viewport_map>
    </image_layer>
    <!-- Graphics layer--->
    <image_layer src=http://www.image.com/frame.gif order="2">
    </image_layer>
    <!-- Force the anchor/aspect layer to be the "frame"--->
    <Viewport aspect_layer="2" />
</image_transform>
``` c) Text Overlay

This example overlays text on the bottom 20% of Viewport

```
<image_transform xmlns="http://www.lightsurf.com/image_transform/
1.0">
<!-- The text layer --->
    <text_layer order="2" text="hello world" fontfile="arial.ttf"
font_color="0x000000" font_size="12" font_size_min="6">
        <Viewport_map>
            <window x="0.0" y="0.8" width="1.0" height="0.2" />
        </Viewport_map>
    </text_layer>
</image_transform>
```

D. Summary of Internal Operation

1. Overall Operation

Figure 6A:
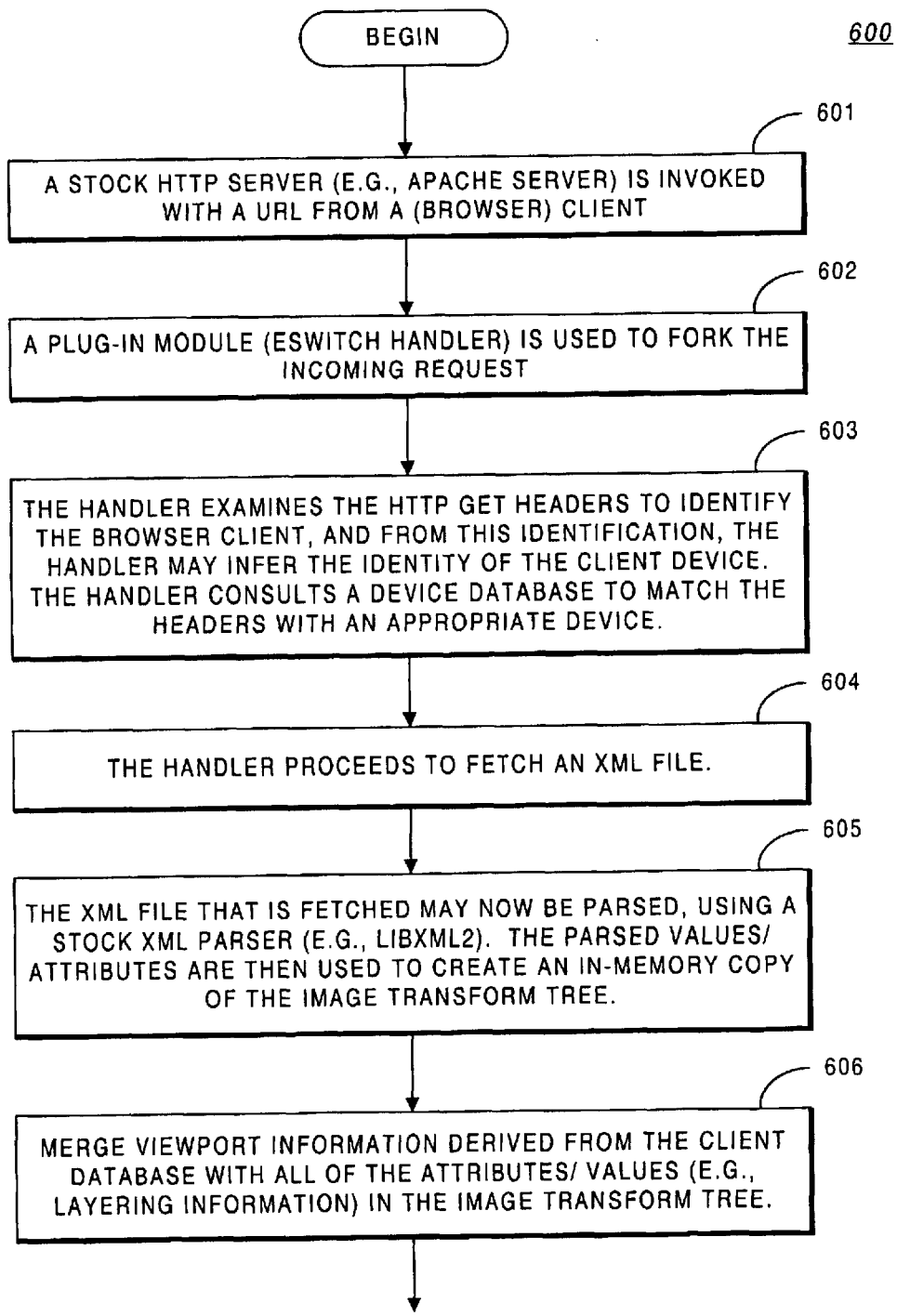
FIGS. 6A–B comprise a flowchart illustrating the overall methodology employed by the present invention supporting dynamic viewport layering.
Figure 6B:
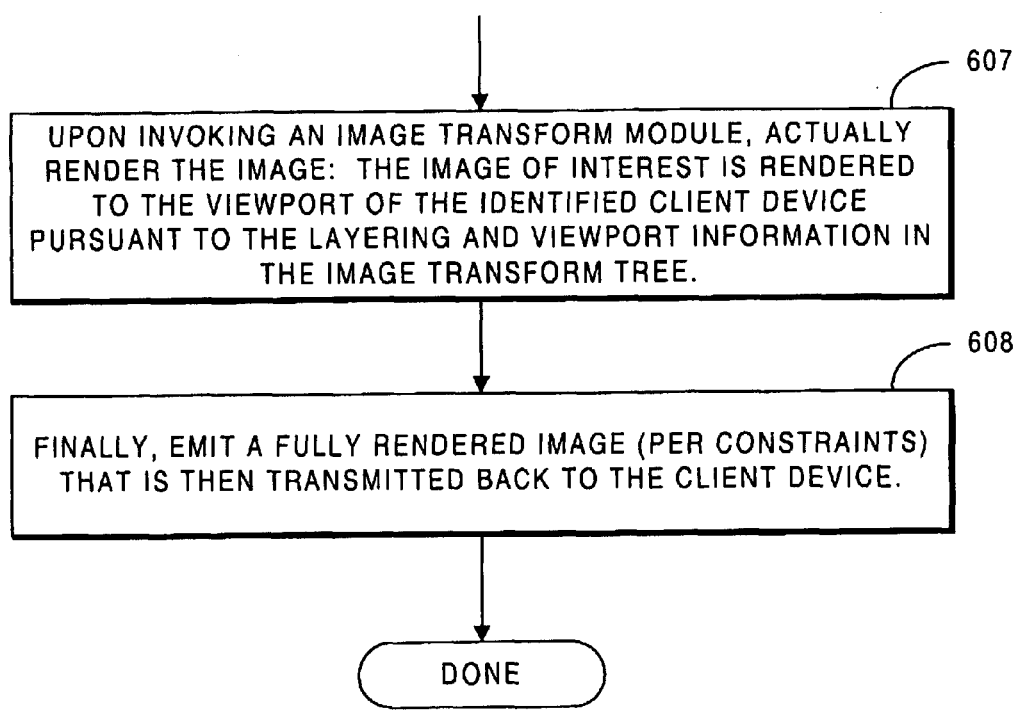

FIGS. 6A–B comprise a flowchart illustrating the overall methodology 600 employed by the present invention for supporting dynamic viewport layering. At the outset, a stock HTTP server (e.g., Apache server) is invoked with an online request (e.g., HTML request), such as a URL from a (browser) client, for retrieving a target image (e.g., from an image repository), as indicated at step 601. This HTTP invocation (online request) from the client includes an HTTP GET command, which comprises a URL plus headers (including a header identifying client browser type). The URL itself may comprise a typical Web-based URL, for example specifying a location and accompanying name/value pairs. As the client invokes the HTTP server directly, the HTTP server may be thought of as the front end of the system. A plug-in module (eSwitch™ handler) is used to fork the incoming request, as indicated at step 602. Now, the eSwitch™ handler may examine the HTTP GET headers to identify the browser client, as indicated at step 603, and from this identification, the handler may infer the type or identity of the client device (i.e., device type). During operation of the step, the handler consults a device database to match the headers with an appropriate device, for example, as described in the above-referenced commonly owned application Ser. No. 09/588,875, filed Jun. 6, 2000, and application Ser. No. 10/010,616, filed Nov. 8, 2001.

After identification of the device, the handler proceeds to fetch an XML (configuration) file, at step 604. The URL submitted by the client (at step 601) specified, as one of the name/value pairs, a particular XML file which stores, in a hierarchical fashion, the values for the image transform tree (which describes both the viewport and layers). The XML file that is fetched may now be parsed, using a stock XML parser (e.g., libXML2), at step 605. The parsed values/attributes are then used to create an in-memory copy of the image transform tree.

The next step is to merge viewport information derived from the client database with all of the attributes and their values (e.g., layering information) in the image transform tree, as shown at step 606. At step 607, upon invoking an image transform module, the method proceeds to actually render the image (i.e., dynamically create a version that is optimized or customized for the client). In particular, the image of interest is rendered to the viewport of the identified client device pursuant to the layering and viewport information in the image transform tree; any image format considerations of the client (e.g., JPEG format requirement) may be applied by transforming the image into the required format. The foregoing process may occur in an iterative fashion. For example, if the dynamically created version is deemed to be too large for the client device or has a bit depth that exceeds the client's capabilities, the step is repeated to create a version that is compliant. During a given iteration, encoding/rendering parameters (e.g., image dimensions) may be dynamically adjusted to achieve on-demand generation of an image that is optimized for the client device. Finally, as indicated by step 608, the method emits a fully rendered image (per constraints) that is then transmitted back to the client device (e.g., via wireless connectivity, via Internet connectivity, via wireless Internet connectivity, or the like) in an appropriate format. The image may be cached for future retrieval (e.g., by the same device type), as desired.

2. Image Transform Object

The Image Transform Object class definition (class ImageTransform), which closely mirrors the XML description, includes data members responsible for creating/supporting the various image layers. Each layer itself is an object in its own right. When the Image Transform Object is instantiated, all of the embedded objects are likewise instantiated.

The Image Transform Object includes a "Render" method, Render ( ). In basic operation, the "Render" method invokes a corresponding rendering method on each embedded object so that each layer is correctly rendered. Rendering occurs against an in-memory version (e.g., canonical format, such as a bitmap) of the Viewport, that is, a Viewport object. Ultimately, each embedded object is rendered against the Viewport object for generating a "candidate" rendered image. Next, the candidate image is encoded (e.g., JPEG encoded) to a format that is appropriate for the client, for generating a candidate transformed image. Once the candidate image is transformed, the resulting image is checked for compliance with applicable constraints (e.g., file size), as previously illustrated in FIG. 4. For example, if the fully rendered image is transformed to JPEG, the resulting JPEG file is not acceptable as the final output if the file exceeds the maximum specified file size. Therefore, the process may iterate, including "remapping" the Viewport and re-rendering the image (if necessary), to generate a final image file that complies with the constraints applicable to the target client. Internally, the File Size Control block estimates a different set of (control) parameters (e.g., reducing Viewport size, bit depth, JPEG quality, or the like) to get a new file size. For example, if the file size of the transformed candidate image is too large, the method may reset the Viewport with a smaller screen size for generating a transformed candidate image with a smaller file size.

While the invention is described in some detail with specific reference to a single-preferred embodiment and certain alternatives, there is no intent to limit the invention to that particular embodiment or those specific alternatives. For instance, examples have been presented which focus on "displaying" images at client devices. Those skilled in the art will appreciate that other client-side outputting or rendering, such as printing, may benefit from application of the present invention. Therefore, those skilled in the art will appreciate that modifications may be made to the preferred embodiment without departing from the teachings of the present invention.

What is claimed is:

1. A computer-implemented method for dynamically optimizing display of an image transmitted to a client device, the method comprising:

receiving an online request from a particular client device for retrieving a target image for display, said request including information assisting with determination of a device type for the client device, and said target image comprising image components arranged into individual layers;

based on said request, determining a device type for the particular client device;

based on the determined device type, retrieving information specifying viewport and layering information for the particular client device;

based on said viewport and layering information, creating a version of the target image optimized for display at the particular client device; and transmitting the created version of the target image to the client device for display.

2. The method of claim 1, wherein said step of determining a device type includes:

consulting a device database to determine a device type for the client device.

3. The method of claim 2, wherein said step of consulting a device database includes:

retrieving information from the device database that indicates a particular configuration file available for optimizing display of images for the particular client device.

4. The method of claim 3, wherein said particular configuration file specifies display capability information about the particular client device.

5. The method of claim 3, wherein said particular configuration file comprises an XML file specifying viewport and layering information for the particular client device.

6. The method of claim 1, wherein said online request comprises a Web-based request.

7. The method of claim 1, wherein said online request comprises an HTML-based request.

8. The method of claim 1, wherein said online request includes information identifying a particular target image.

9. The method of claim 1, wherein said online request is initiated from a browser operating at the particular client device and includes information identifying a particular type of client device.

10. The method of claim 1, wherein said online request comprises a URL.

11. The method of claim 1, wherein said information assisting with determination of a device type for the particular client device comprises header information transmitted with said online request.

12. The method of claim 11, wherein said header information transmitted with said online request is compared against a database of device types for determining which specific type of device the particular client device is.

13. The method of claim 1, wherein said information assisting with determination of a device type for the particular client device comprises HTTP header information.

14. The method of claim 1, wherein said information specifying viewport and layering information for the particular client device is maintained in a hierarchical fashion in an XML file.

15. The method of claim 14, wherein said XML file includes constraint values based on device limitations of the particular client device.

16. The method of claim 15, wherein said constraint values indicate a maximum image size that can be displayed at the particular client device.

17. The method of claim 1, wherein said step of creating a version of the target image optimized for display at the client device includes:

rendering said image components in the individual layers in a manner that conforms to said viewport and layering information for the particular client device.

18. The method of claim 1, wherein said step of creating a version of the target image optimized for display at the client device includes:

iteratively creating different versions of the target image based on said viewport and layering information until an appropriate target image that is optimized for display at the client device is found.

19. The method of claim 1, further comprising:

before transmitting the created version of the target image to the particular client device, transforming the created version into a file format suitable for the client device.

20. The method of claim 19, wherein said file format includes JPEG-compatible file format.

21. The method of claim 1, wherein each of said layers maintains image components of a given type.

22. The method of claim 21, wherein a given layer maintains image components selected from one of bitmaps, animations, text, and vector graphics.

23. A tangible computer-readable storage medium having processor-executable instructions for performing the method of claim 1.

24. A downloadable set of processor-executable instructions for performing the method of claim 1.

25. A computer-implemented system for on-demand creation of images that are customized for a particular device type, the system comprising:

a module serving as a repository for images, each image comprising image components arranged into distinct layers;

a module for processing a request from a device for retrieving a particular image from the repository, said module determining a particular device type for the device based in part on information contained in the request; and a module for creating a copy of the particular image that is customized for the device, said module individually rendering image components in the distinct layers of the particular image based on said determined device type, such that at least some of the image components in the distinct layers of the particular image are customized for the device, and wherein the copy of the particular image is created in a manner that conforms to viewport constraints of the device.

26. The system of claim 25, wherein the copy of the particular image is created in a manner that conforms to image size constraints of the device.

27. The system of claim 25, further comprising:

a module for transforming the copy of the particular image into an image format that is compatible with the device.

28. The system of claim 25, wherein said module for processing a request operates on a server computer.

29. The system of claim 28, wherein said server computer includes Internet connectivity.

30. The system of claim 25, wherein said device communicates with the system via wireless connectivity.

31. The system of claim 25, wherein said device communicates with the system via wireless connectivity to the Internet.

32. The system of claim 25, further comprising an image cache for caching the copy of the particular image that is customized for the device.

33. The system of claim 25, wherein said request comprises an HTML request.

34. The system of claim 25, wherein said request is initiated from a browser operating at the device.

35. The system of claim 25, wherein said request includes header information allowing determination of a device type.

36. The system of claim 35, further comprising:

a device database for assisting with identification of the device type based on said header information.

37. The system of claim 36, wherein said device database indicates an available configuration file that is useful for creating a copy of the particular image that is customized for the device.

38. The system of claim 25, wherein said configuration file comprises an XML file specifying layering and viewport information for the device.

39. The system of claim 25, wherein said module for creating a copy iteratively creates different candidates of the particular image until an appropriate one that is optimized for display at the device is created.

40. An image retrieval method including an improvement for optimizing display of requested images, the improvement comprising:

organizing each image into different layers, with each layer having image components of a certain type;

storing information indicating how to optimize a given layer for a particular type of device that the given image is to be displayed at;

when receiving a request for retrieving a particular image, identifying what type of device is requesting the particular image;

based on the type of device requesting the particular image, retrieving the stored information that indicates how to optimize a given layer of the image for the device that is requesting the image; and based on the retrieved information, rendering individual layers of the image to dynamically generate a rendered image that is optimized for display at the device, and maintaining viewport information for different types of devices, so that the rendering may be performed in a manner that conforms to constraints appropriate at the device.

41. The improvement of claim 40, wherein, if the rendered image that is dynamically generated has an image size that is too large for the device requesting the particular image, said rendering step is repeated to generate an image having a smaller image size.

42. The improvement of claim 40, wherein a given layer maintains image components selected from one of bitmaps, animations, text, and vector graphics.

43. The improvement of claim 42, wherein one layer is dedicated for rendering a border.

44. The improvement of claim 40, wherein said information indicating how to optimize each layer for a particular type of device is stored in device type-specific configuration files.

45. The improvement of claim 44, wherein said device type-specific configuration files comprise XML files, each file storing information about rendering images for a particular device type.

46. The improvement of claim 44, wherein each device type-specific configuration file includes layering and viewport information for a particular device type.

47. The improvement of claim 40, wherein said request comprises a browser request received from a device connected to the Internet.

48. The improvement of claim 40, wherein said step of identifying what type of device is requesting the particular image includes parsing the request for obtaining information that assists in identifying the type of device.

* * * * *